(12) United States Patent
Lamb et al.

(10) Patent No.: US 6,697,620 B1
(45) Date of Patent: Feb. 24, 2004

(54) METHOD AND SYSTEM FOR PROVIDING TELECOMMUNICATION SERVICES ACROSS NETWORKS THAT USE DIFFERENT PROTOCOLS

(75) Inventors: James A. Lamb, Elkhorn, NE (US); Andre L. de Verteuil, Toronto (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 09/602,004

(22) Filed: Jun. 23, 2000

Related U.S. Application Data
(60) Provisional application No. 60/141,110, filed on Jun. 24, 1999.

(51) Int. Cl.[7] .................................................. H04Q 7/20
(52) U.S. Cl. ............................... 455/432.1; 455/435.1; 455/552.1
(58) Field of Search .......................... 455/432.1, 435.1, 455/552, 553, 433, 436

(56) References Cited

U.S. PATENT DOCUMENTS

| | | | | |
|---|---|---|---|---|
| 5,497,412 A | | 3/1996 | Lannen et al. ................. | 379/60 |
| 5,610,974 A | | 3/1997 | Lantto .......................... | 379/59 |
| 5,862,481 A | * | 1/1999 | Kulkarni et al. .............. | 455/432 |
| 6,002,931 A | * | 12/1999 | Yamaguchi et al. .......... | 455/433 |
| 6,125,122 A | * | 9/2000 | Favichia et al. ............. | 370/466 |
| 6,259,917 B1 | * | 7/2001 | Elzein .......................... | 455/435 |
| 6,298,232 B1 | * | 10/2001 | Marin et al. ................. | 455/413 |
| 6,473,413 B1 | * | 10/2002 | Chiou et al. ................. | 370/331 |

FOREIGN PATENT DOCUMENTS

| | | | |
|---|---|---|---|
| EP | 0 758 835 A2 | 2/1997 | ............ H04Q/7/38 |
| WO | WO 97/01942 | 1/1997 | ............ H04Q/7/38 |
| WO | WO 98/00986 | 1/1998 | |
| WO | WO 98/30050 | 7/1998 | ............ H04Q/7/20 |
| WO | WO 98/37724 | 8/1998 | ............ H04Q/11/00 |

\* cited by examiner

*Primary Examiner*—Marsha D. Banks-Harold
*Assistant Examiner*—Nghi Han Ly

(57) ABSTRACT

A method and system provide seamless, wireless telecommunication service to customers that move between disparate networks that use different protocols. A Universal Location Service Register (ULSR) communicates and provides mobility management and authentication functions across networks that use different protocols. Instead of associating each MSC with an HLR and an AuC that uses the same messaging protocol as the MSC, each MSC communicates with the ULSR for user information. The ULSR communicates with the MSCs in each network serviced by the ULSR in accordance with the protocol of that network. The ULSR stores user profiles that may include the identity of the user, authentication information for the user's mobile phone, a list of networks the user is authorized to access, and the identity of the MSC at which the user is currently registered.

5 Claims, 21 Drawing Sheets

METHOD AND SYSTEM FOR PROVIDING TELECOMMUNICATION SERVICES ACROSS NETWORKS THAT USE DIFFERENT PROTOCOLS

RELATED APPLICATIONS

This application claims the benefit of U.S. Provisional Application No. 60/141,110, filed on Jun. 24, 1999, and titled "Universal Location Service Register (ULSR)," the contents of which are incorporated by reference as if fully disclosed herein.

BACKGROUND OF THE INVENTION

1. Field of the Invention

This invention relates generally to telecommunication services, and, more specifically to a system and method for providing telecommunication services across networks that use different protocols.

2. Description of Background Art

In many conventional telecommunication networks that provide wireless telecommunication services, such as ANSI-41 and GSM networks, each mobile phone user is associated with a Mobile Switching Center (MSC) that is referred to as a user's "home MSC." A mobile phone user's home MSC receives all calls for the user and either (1) routes the calls to the user if the user is within the coverage area of the home MSC or (2) if the user is not within the coverage area of the home MSC, routes the calls to the MSC at which the user is currently registered (the "serving MSC"), where the serving MSC then routes the calls to the user.

In conventional ANSI-41 and GSM networks, each MSC is associated with a Home Location Register (HLR), a Visitor Location Register (VLR) and an Authentication Center (AuC). The functions of an AuC include storing authentication information for mobile phone users whose home MSC is the MSC associated with the AuC. The functions of an HLR include storing profiles of users whose home MSC is the MSC associated with the HLR and, for each of such users, storing the identity of the MSC at which the user is currently registered. The functions of VLR include storing users profiles of roaming users temporarily registered at the MSC associated with the VLR.

When a user roams out of the territory of his home MSC and into the territory of a serving MSC, the VLR of the serving MSC (the "serving VLR") needs to communicate with the HLR of the home MSC (the "home HLR") in order to enable the user to register at the serving MSC and to enable the home MSC to route calls for the user to the serving MSC. For instance, the serving VLR informs the home HLR that the user has requested registration at the serving MSC, and the home HLR sends the serving VLR user profile information. Additionally, when the home MSC receives a call for the user, the serving VLR sends the routing number of the serving MSC to the home HLR, which enables the home MSC to route the call to the serving MSC.

Due to the variety of portable telecommunication devices, it is not uncommon for customers to subscribe to telecommunication services that are provided by multiple telecommunication networks. A customer may subscribe to multiple telecommunication networks that each cover a distinct and separate service area or that have overlapping service areas, as is the case if a customer subscribes to a satellite based system and an ANSI-41 based system both having broad service coverage in North America. In some cases the customer may use a device that is capable of working in multiple networks, such as a dual mode mobile phone that supports two of the wireless air interface standards commonly used in North America (e.g., PCS1900 and TDMA standards), or the customer may use multiple devices where each device operates in a specific telecommunications network. Customers may require access to telecommunication services from one network at a time or from multiple networks simultaneously depending on their current geographic location and the service coverage of the telecommunications networks to which they subscribe.

As indicated above, in order to provide seamless services to customers as they travel or switch between different networks, various HLRs and VLRs in the different networks need to communicate with each other. However, this can be problematic because many of the telecommunication networks use different protocols for communications between the HLRs, VLRs, AuCs, and MSCs within their own networks. For instance, many North American networks use the ANSI-41 protocol and many European networks use the GSM protocol. Therefore, it is necessary to enable networks that use different protocols to communicate with each other in order to provide seamless service to customers as they move between these networks.

There are known methods for enabling communication between disparate networks that use different protocols. One such method, which is described in U.S. Pat. No. 5,862,481, provides an Inter-Technology Roaming Proxy (IP) that translates requests from one network to another. One problem with this method is that if many networks are involved, a lot of additional equipment is required. For N networks, the number of IPs required is N(N−1). For example, two networks require two (2) IPs, and four networks require twelve (12) IPs. Additionally, this method fails to provide a way to manage feature and service interactions when a customer has simultaneous access to telecommunications services from multiple networks.

Therefore, it is desirable to provide seamless services to customers as they roam into disparate networks without using as much equipment as known methods for providing such services. Additionally, it is desirable to manage feature and service interactions for customers that have simultaneous access to telecommunication services in multiple networks.

SUMMARY OF THE INVENTION

The present invention provides a method and system for providing seamless, wireless telecommunication services to customers that move between disparate networks. A Universal Location Service Register (ULSR) communicates and provides mobility management and authentication functions across networks that use different protocols. Instead of each MSC communicating with its own HLR and AuC to exchange user information, each MSC communicates with the ULSR to exchange such information, thereby eliminating the need for associating each MSC with its own HLR and AuC. The ULSR communicates with the MSCs in each network serviced by the ULSR in accordance with the protocol of that network. The ULSR store user profiles that may include the identity of the user, authentication information for the user's mobile phone, a list of networks the user is authorized to access, and the identity of the MSC at which the user is currently registered.

When a user roams into a network other than the user's home network and requests registration at an MSC in the such network (the "serving network"), the MSC (the "serving MSC") notifies the ULSR that the user has requested registration. The ULSR determines whether the user can be registered at the serving MSC, and, if so, authorizes the registration. When a call is received for the user at an MSC in the user's home network, the home MSC sends a request for the routing number to the ULSR. The ULSR retrieves the user's profile and determines that the user is registered at the serving MSC. The ULSR sends a request for a routing number to the serving MSC, and the serving MSC provides the ULSR with a routing number. The ULSR then sends the routing number to the home MSC, and the home MSC routes the call to the serving MSC, which routes the call to the user. The ULSR communicates with the home network in accordance with the protocol used by the home network, and the ULSR communicates with the serving network in accordance with the protocol used by the serving network.

In one embodiment, the ULSR also manages feature and service interactions for customers. For instance, the ULSR may determine, based on the user's profile, whether a user is subscribed to call waiting or call forwarding service and then instruct the applicable MSC accordingly. In yet another embodiment, if a user is simultaneously registered in multiple networks, the ULSR will use information stored in the user's profile and/or internal logic to determine to which network a call for the user should be forwarded.

Therefore, the present invention provides seamless service to wireless device users as they roam across multiple networks while reducing the amount of equipment used by known methods. Additionally, according to one embodiment, the present invention manages feature and service interactions for users that have simultaneous access to telecommunication services in multiple networks.

DETAILED DESCRIPTION OF THE PREFERRED EMBODIMENTS

Figure 1:
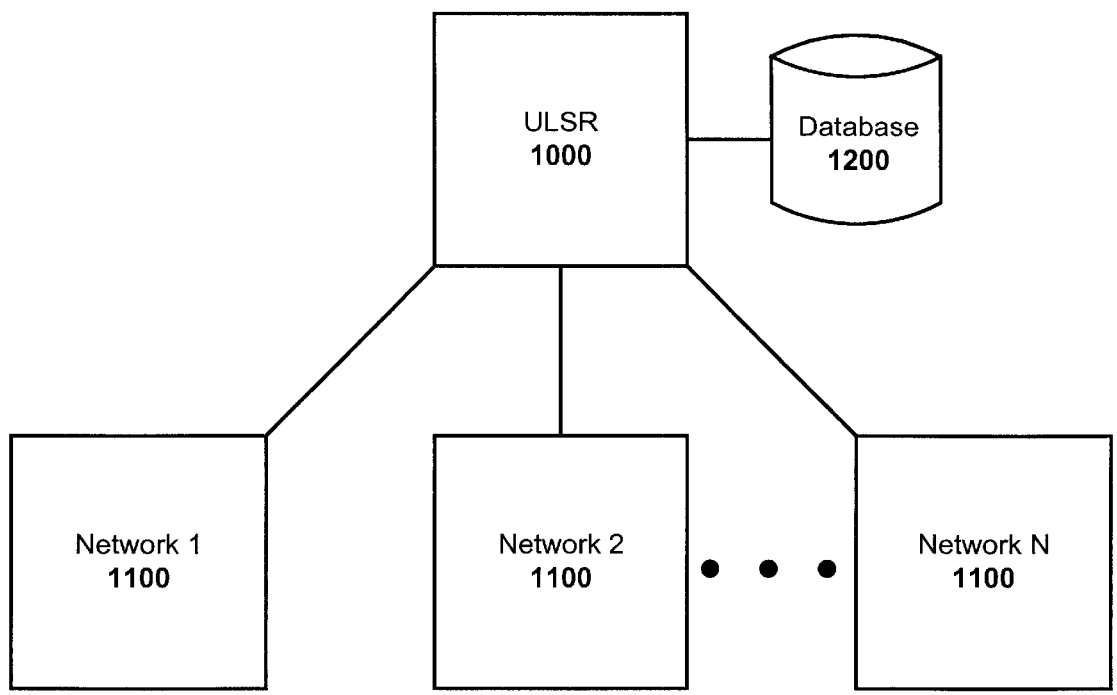
FIG. 1 illustrates a ULSR coupled to multiple telecommunications networks in accordance with one embodiment of the present invention.

FIG. 1 illustrates a Universal Location Service Register (ULSR) 1000 in accordance with the present invention. The ULSR 1000 can communicate and provide mobility management and authentication functions across telecommunication networks 1100 that use different protocols. (e.g., ANSI-41 networks and GSM networks). As will be discussed below, in one embodiment, the ULSR 1000 is also capable of managing feature and service interactions for instances when a subscriber has access to multiple networks 1100.

Because the ULSR 1000 is capable of communicating independently and simultaneously with networks that use different signaling standards, seamless service can be provided to a mobile phone user who roams into a network using a different protocol than his home network. The ULSR 1000 can receive a message from one network and respond to that message, even if processing the message involves sending a message to and receiving a message from another network that uses a different signaling protocol. For instance, a LocationRequest message received by the ULSR 1000 from an ANSI-41 network may result in the ULSR 1000 sending a Provide_Roaming_Number message to a GSM network if the ULSR 1000 knows that the subscriber is in the GSM network when the LocationRequest message is received. When the ULSR 1000 receives a response from the GSM network to its Provide_Roaming_Number request, the ULSR 1000 uses the information in the response to reply to the ANSI-41 network's LocationRequest message.

The ULSR 1000 has access to a database 1200 that stores information about subscribers to the networks 1100 serviced by ULSR 1000, where the information in the database 1200 enables the ULSR 1000 to provide mobility management and authentication functions for all the networks 1100 that the ULSR 1000 supports. Such information may include the location at which the user is currently registered, the user's home network, a list of networks to which a user is authorized to access, and data for authenticating the user. Some of the information in the database 1200 may be specific to one network, and other information may be used to provide mobility and authentication functions for multiple networks. When a specific network needs information from the database 1200, the ULSR 1000 encodes the information in accordance with the format and protocol required by that network.

Figure 2A:
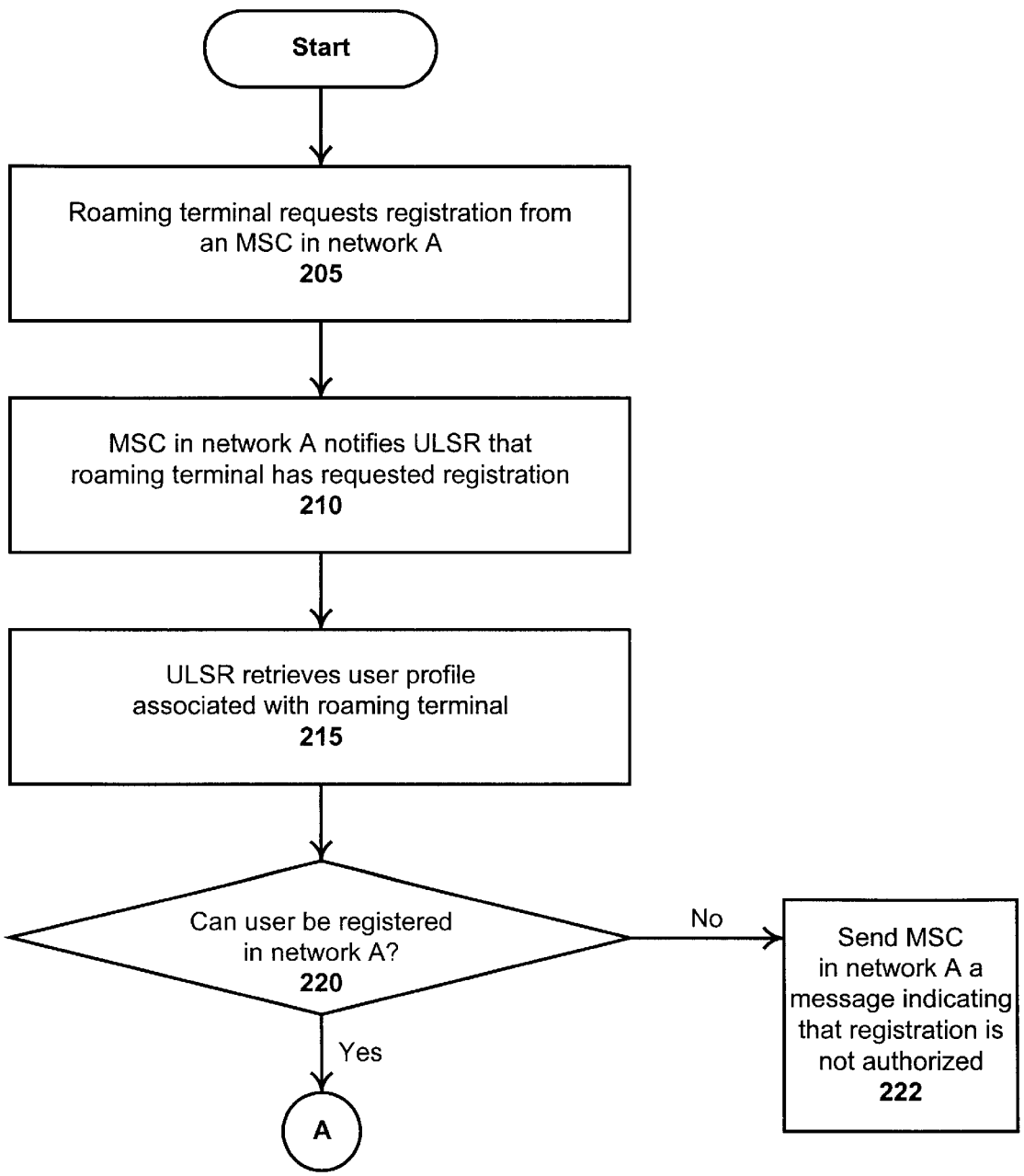
FIGS. 2a–c illustrate a method according to one embodiment of the present invention for registering a mobile phone user in network A, where the mobile phone user was previously registered in network B.
Figure 2B:
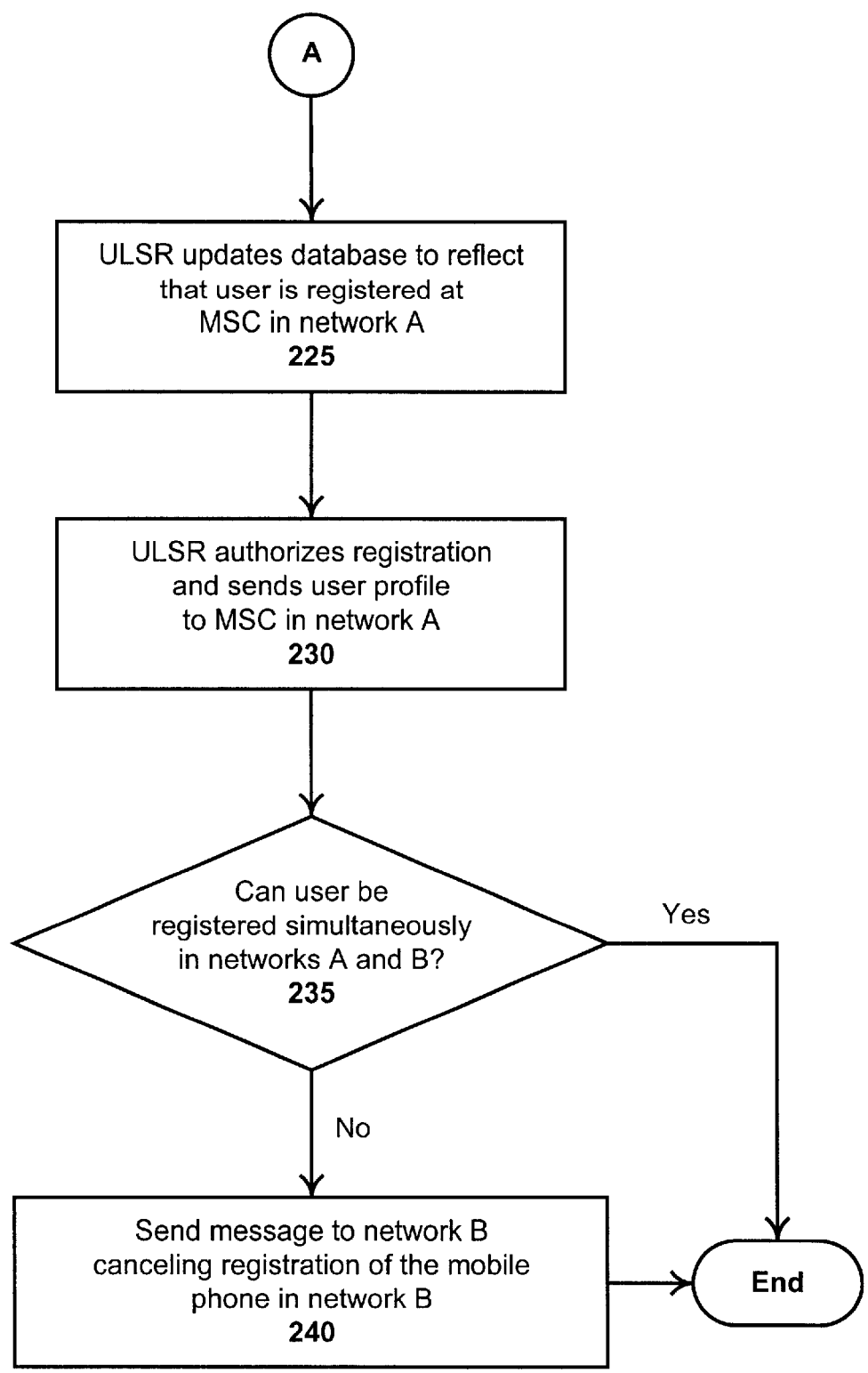
Figure 2C:
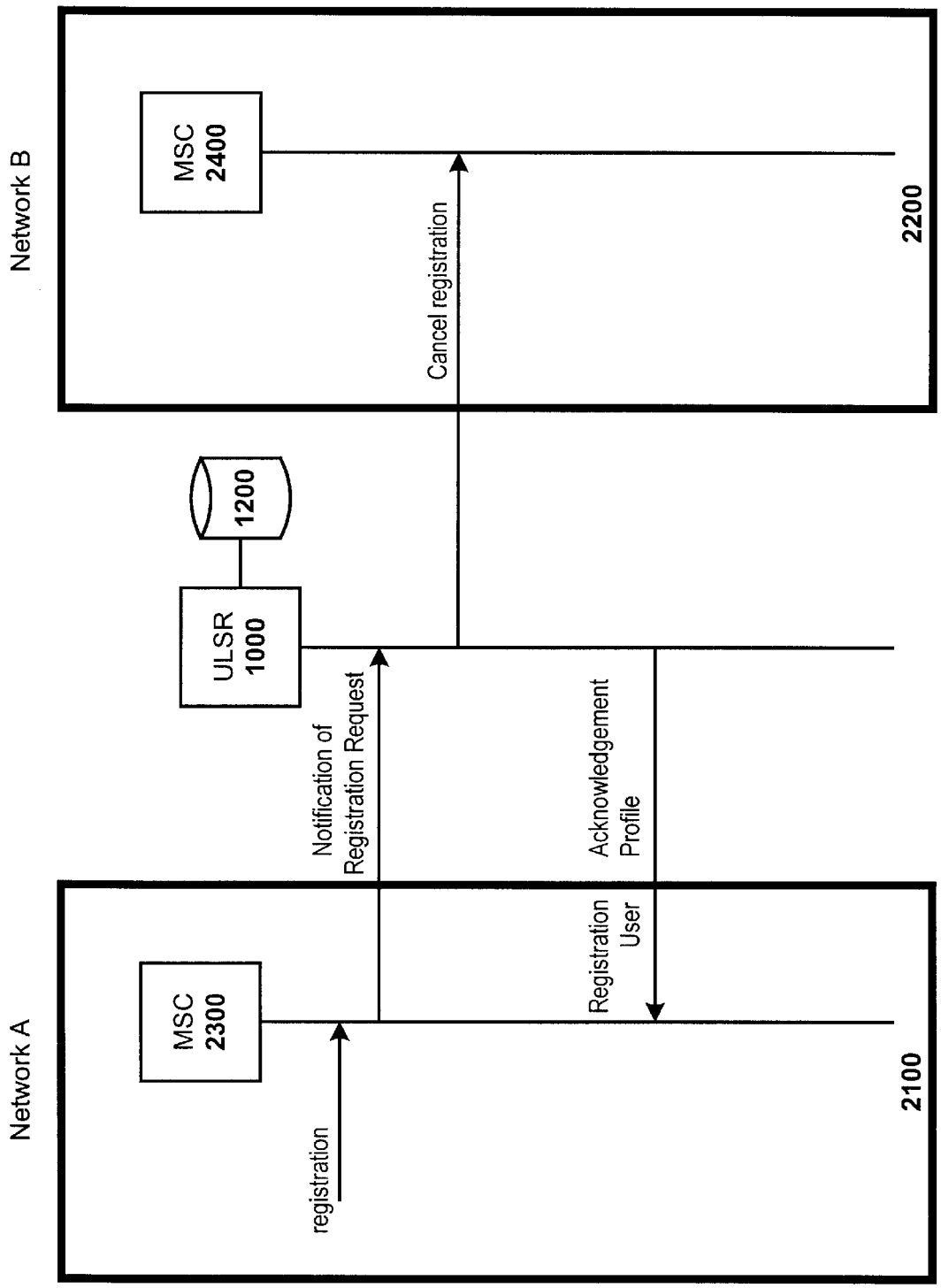

FIGS. 2a–2c illustrate a method according to one embodiment of the present invention for registering a mobile phone in a network A (which may be a GSM, ANSI-41, or other network), where the mobile phone was previously registered in a network B (which may be a GSM, ANSI-41, or other network). The registration procedure begins when the roaming mobile phone in the territory of network A realizes it can no longer communicate with network B. When this happens, the roaming terminal requests 205 registration from an MSC 2300 in network A and sends information identifying itself (e.g., Mobile Serial Number (MIN), Electronic Serial Number (ESN), or International Mobile Subscriber Identity (IMSI)) to the MSC 2300 in network A. The MSC 2300 in network A notifies 210 the ULSR 1000 that the mobile phone has requested registration in network A and sends the ULSR 1000 information identifying the mobile phone. In response to receiving this message from the MSC 2300 in network A, the ULSR 1000 retrieves 215 from its database 1200 the user profile associated with mobile phone and determines 220 whether the mobile phone can be registered in network A. If so, the ULSR 1000 updates 225 the database 1200 to reflect that the mobile phone is currently registered at the MSC 2300 in network A, and the ULSR 1000 sends a message to the MSC 2300 in network A authorizing 230 such registration. The ULSR 1000 also sends 230 the user's profile to the MSC 2300 in network A. If the mobile phone cannot be registered in network A, the ULSR responds to the registration request by sending 222 the MSC 2300 in network A a message indicating that registration is not authorized. The ULSR 1000 and network A communicate with each other in accordance with the protocol of network A.

Figure 3A:
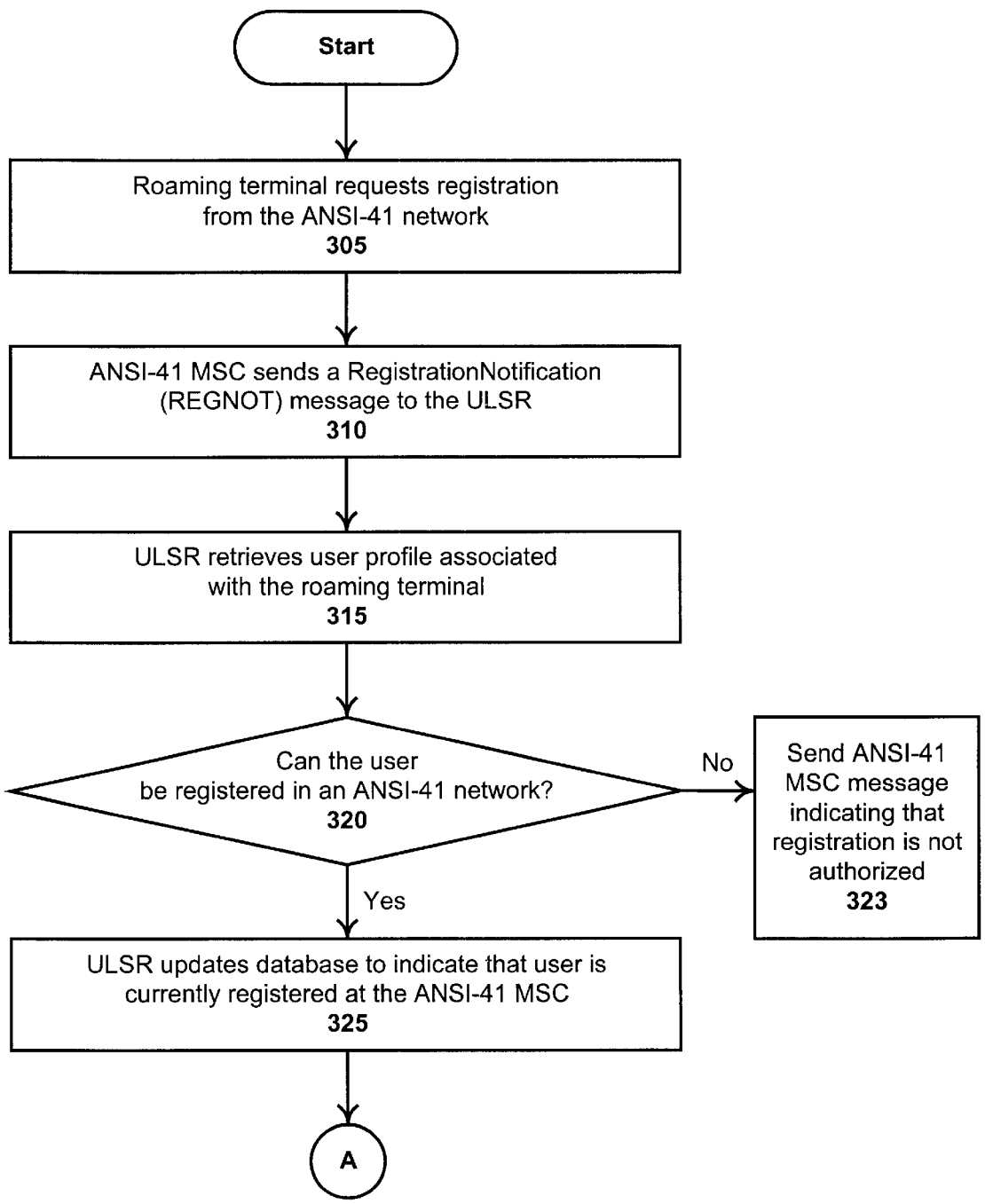
FIGS. 3a–c illustrate a method according to one embodiment of the present invention for registering a mobile phone user in an ANSI-41 network, where the user was previously registered in/a GSM network.
Figure 3B:
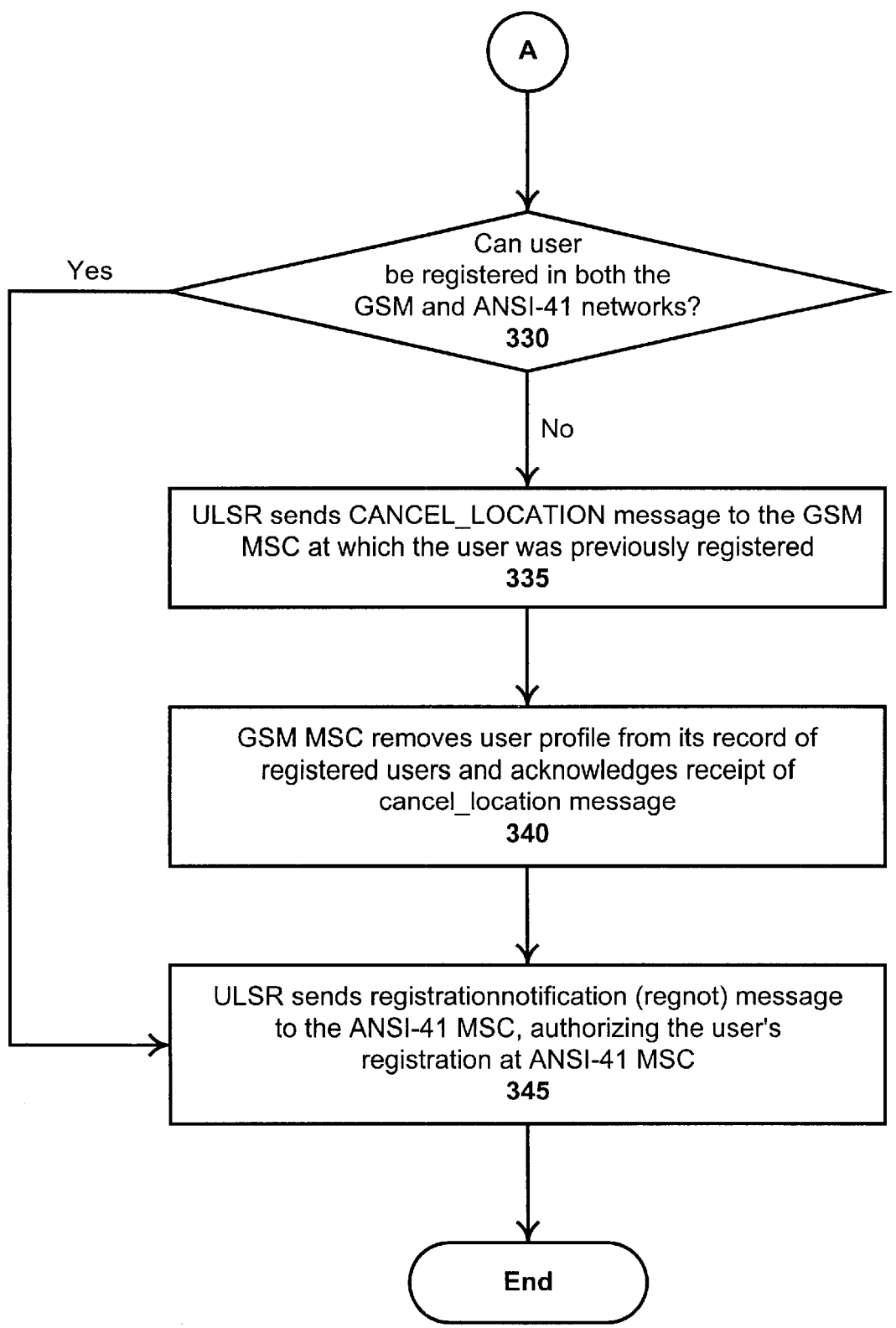
Figure 3C:
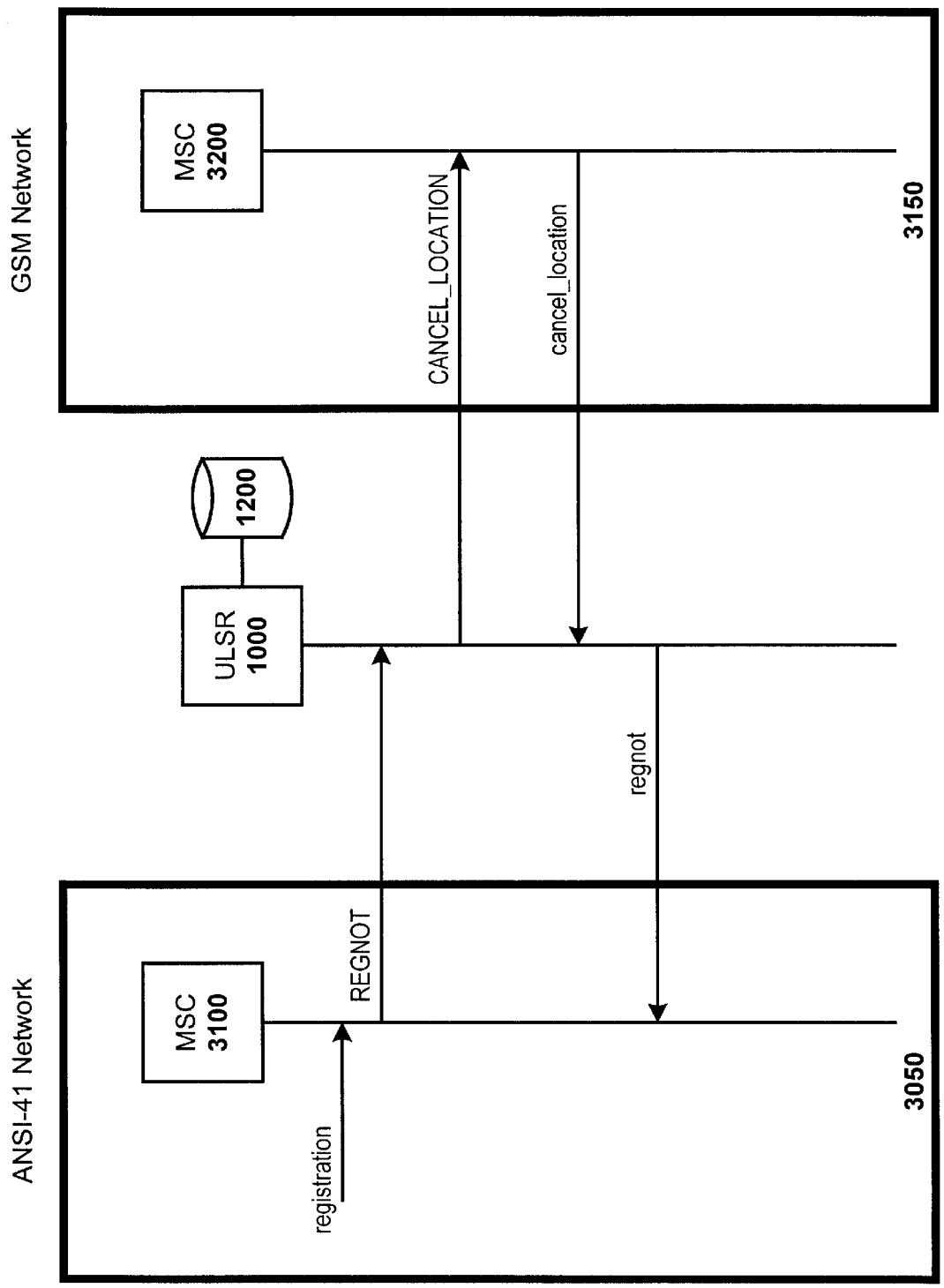

The ULSR 1000 also determines 235 whether the user can be simultaneously registered in both networks A and B. If so, the process is complete. If not, the ULSR 1000 sends 240 a message to the MSC 2400 in network B at which the mobile phone was previously registered, canceling the registration of the mobile phone in network B. The ULSR 1000 and network B communicate with each other in accordance with the protocol of network B. FIGS. 3a–3c illustrate an example of using the method discussed with respect to FIG. 2 for registering a mobile phone user in an ANSI-41 network 3050, where the user was previously registered in a GSM network 3150. Note that the MIN and ESN parameters, as well as the RegistrationNotification (REGNOT), registrationnotification (regnot), RegistrationCancellation (REGCAN), registrationcancellation (regcan), LocationRequest (LOCREQ), and locationrequest (locreq) messages, discussed herein are defined by the ANSI-41 protocol. Similarly, the IMSI parameter and the CANCEL_LOCATION, cancel_location, LOCATION_UPDATE, location_update, INSERT_SUBSCRIBER_DATA, insert_subscriber_data, SEND PARAMETER, send parameter, PROVIDE_ROAMING_NUMBER, and provide_roaming_number messages discussed herein are defined by the GSM protocol. Note also that the names or acronyms for some messages are in upper case letters and some are in lower case letters. In accordance with the ANSI and GSM semantics, a message in lower case letters is a response to a message in upper case letters with the same name.

The registration procedure begins when the roaming mobile phone realizes it can no longer communicate with the GSM network 3150. When this happens, the roaming terminal requests 305 registration from the ANSI-41 network 3050 and uses its MIN and ESN information to identify itself. The MSC 3100 in the ANSI-41 network receiving the registration request (the "ANSI-41 MSC") sends 310 an ANSI-41 RegistrationNotification (REGNOT) message to the ULSR 1000, where the REGNOT message indicates the registration request and includes the MIN and ESN information that identifies the mobile phone. The ULSR 1000 retrieves 315 the user profile associated with the mobile phone from database 1200 and determines 320 from the user profile whether the user can be registered in the ANSI-41 network 3050. If the user cannot be registered in the ANSI-41 network 3050, the ULSR sends 323 the ANSI-41 MSC 3100 a message indicating that registration is not authorized. If the user can be registered in an ANSI-41 network, the ULSR 1000 updates 325 the database 1200 to indicate that the user is currently registered and located at the ANSI-41 MSC 3100.

The ULSR 1000 also determines 330 from the user profile whether the user can be simultaneously registered in both the ANSI-41 and GSM networks 3100, 3150. If the user can be registered in only one of the networks at a time, the ULSR 1000 sends 335 a CANCEL_LOCATION message to the MSC 3200 in the GSM network 3150 at which the user was previously registered, indicating that the user is no longer registered at the GSM MSC 3200. In response to receiving the CANCEL_LOCATION message, the GSM MSC 3200 removes 340 the user profile from its records of registered users and acknowledges 340 receipt of the CANCEL_LOCATION message by sending a cancel_location acknowledgment message.

The ULSR 1000 also sends 345 a registrationnotification (regnot) message to the ANSI-41 MSC 3100, where the regnot message includes the customer's profile and authorizes the user's registration at the ANSI-41 MSC 3100. The ULSR 1000 communicates with the ANSI-41 network 3050 in accordance with standard ANSI-41 protocols and with the GSM network 3150 in accordance with standard GSM protocols.

Figure 4A:
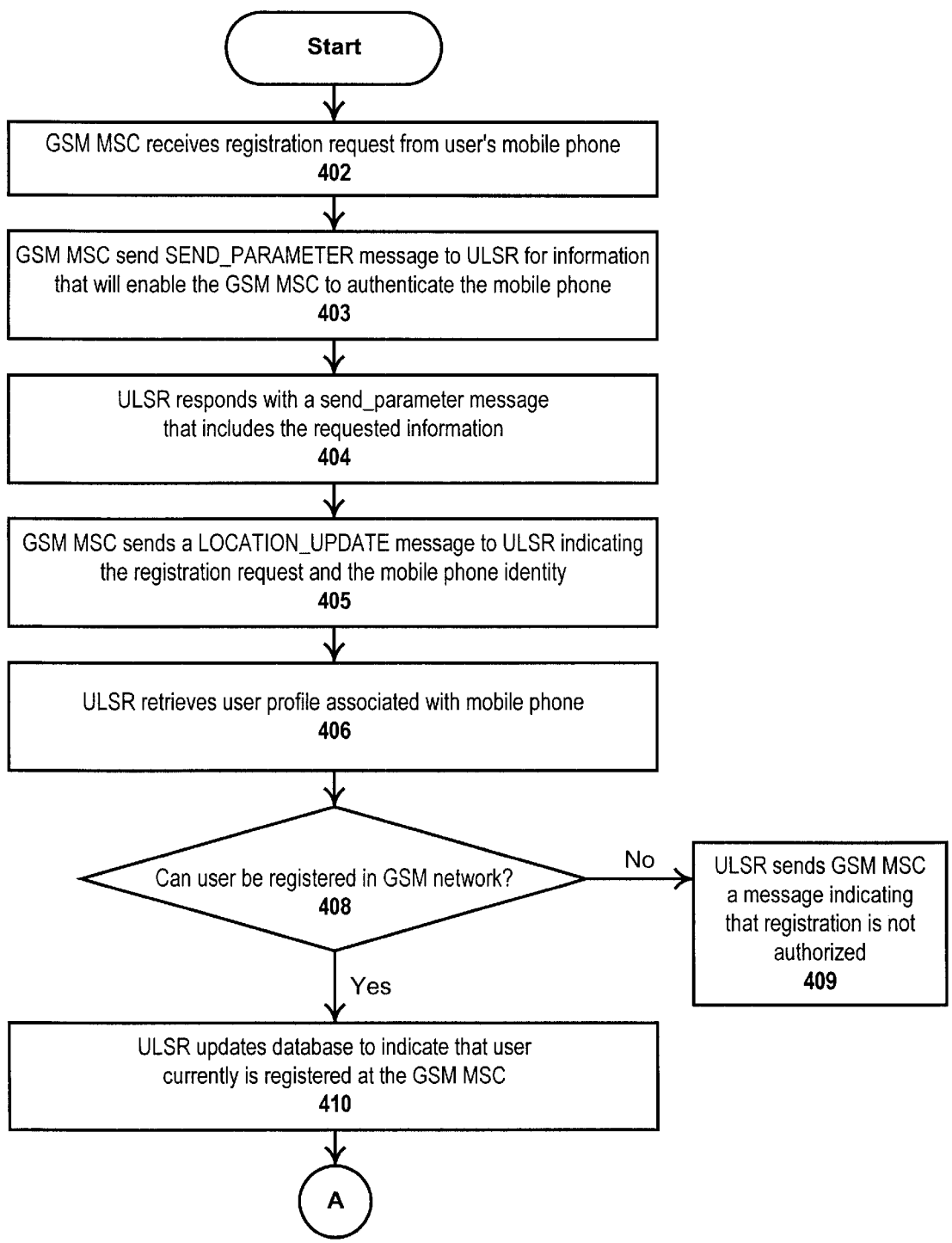
FIGS. 4a–4c illustrate a method according to one embodiment of the present invention for registering a mobile phone user in a GSM network, where the user was previously registered in an ANSI-41 network.
Figure 4B:
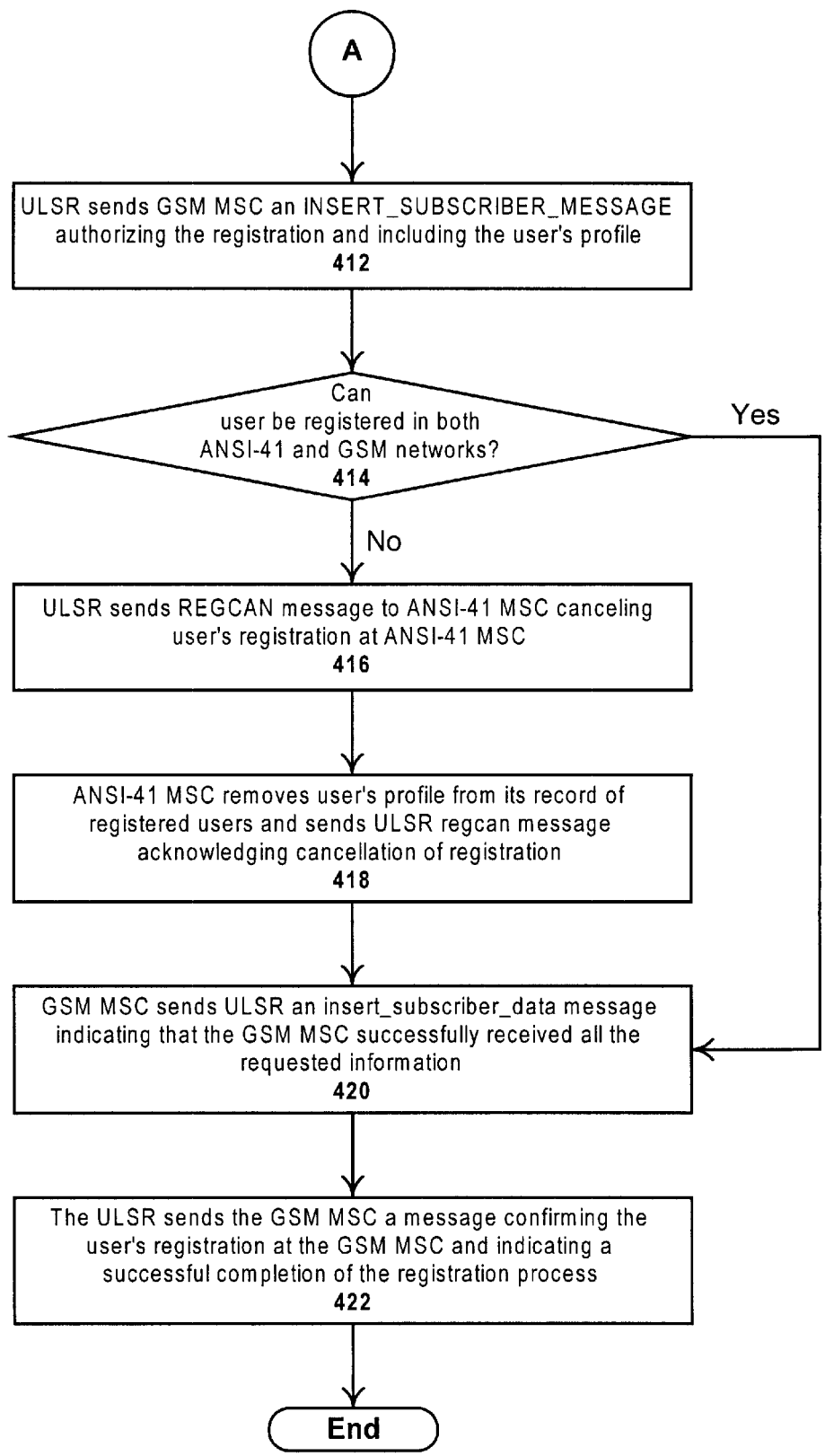
Figure 4C:
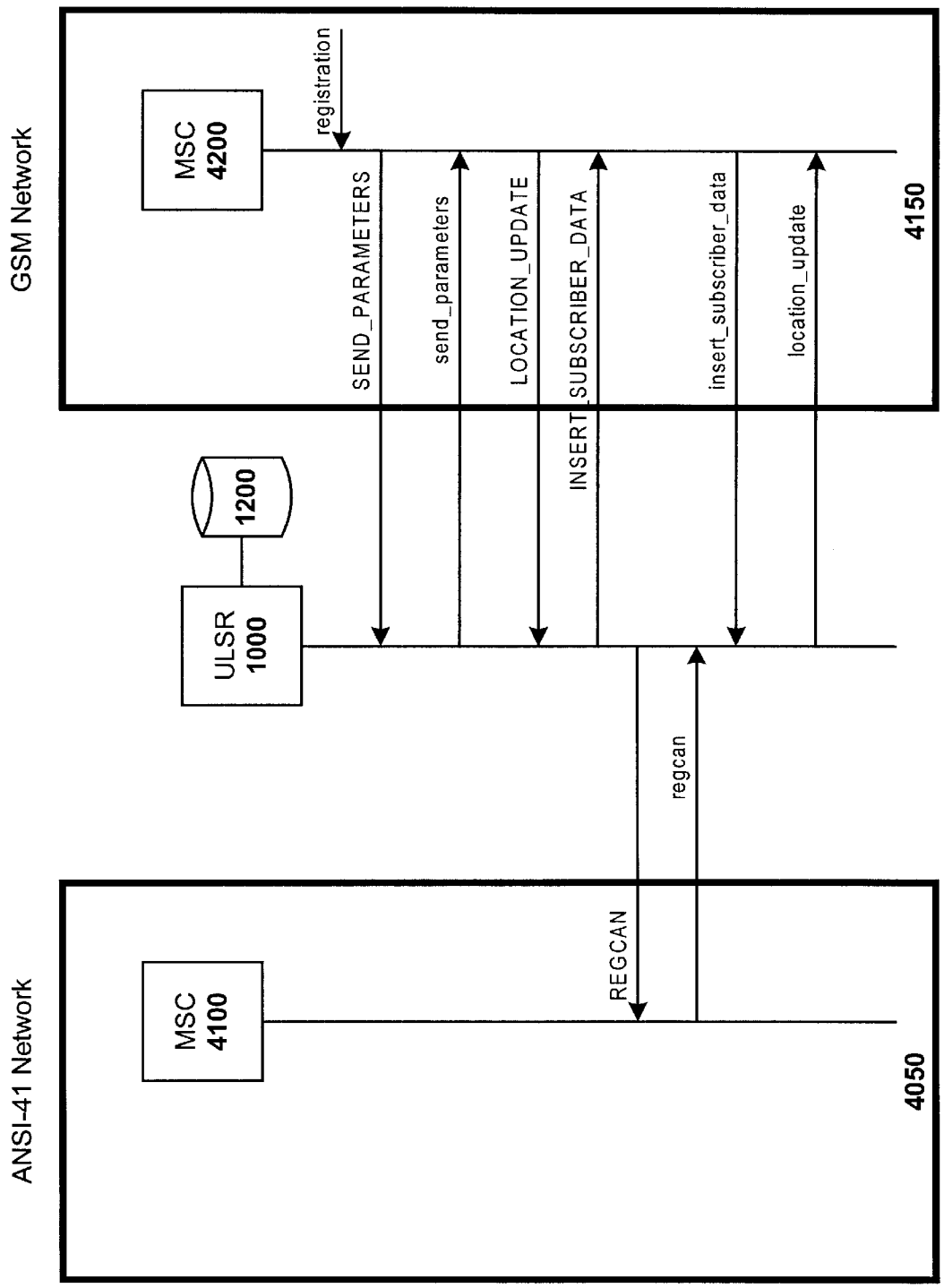

FIGS. 4a–4c illustrate an example of using the method described with respect to FIG. 2 for registering a mobile phone user in a GSM network 4150, where the user was previously registered in an ANSI-41 network 4050. The registration procedure begins when the roaming mobile phone realizes that it can no longer communicate with the ANSI-41 network 4050. When this happens, the roaming terminal requests registration from the GSM network 4150 and uses its IMSI to identify itself. The MSC 4200 in the GSM network 4150 receives 402 the registration request from the mobile phone and sends 403 a SEND_PARAMETERS message to the ULSR 1000, where the SEND_PARAMETERS message asks the ULSR 1000 for information needed by the GSM MSC to authenticate the roaming mobile phone. The ULSR 1000 sends 404 the GSM MSC the requested information in the form of a send_parameter message. If the GSM MSC 4200 is able to authenticate the mobile phone, it sends 405 a LOCATION_UPDATE message to the ULSR 1000, where the LOCATION_UPDATE message indicates the registration request and includes the IMSI information that identifies the mobile phone. The ULSR 1000 retrieves 406 the user profile associated with the mobile phone from its database 1200 and determines 408 from the user profile whether the user can be registered in the GSM network 4150. If the user cannot be registered in the GSM network 4150, the ULSR 1000 sends 409 the GSM MSC a message indicating that registration is not authorized. If the user can be registered in the GSM network 4150, the ULSR 1000 updates 410 database 1200 to indicate that the user is currently registered at the GSM MSC 4200 and sends 412 the GSM MSC 4200 an INSERT_SUBSCRIBER_DATA message that authorizes the user's registration at the GSM MSC 4200 and includes the user's profile.

The ULSR 1000 also determines 414 from the user's profile whether the user can be registered in both the ANSI-41 and GSM networks 4050, 4150. If the user can be registered in only one network, the ULSR 1000 sends 416 a RegistrationCancellation (REGCAN) message to the ANSI-41 MSC 4100 to cancel the user's mobile phone registration at the ANSI-41 MSC 4100. In response to receiving the REGCAN message, the ANSI-41 MSC 4100 removes 418 the user's profile from its records of registered users, and sends 418 the ULSR 1000 a regcan message acknowledging that the user's mobile phone is no longer registered with the ANSI-41 MSC 4100.

After the GSM MSC 4200 successfully receives the INSERT_SUBCRIBER_DATA message with the user profile, it sends 420 the ULSR 1000 a response insert_subscriber_data message acknowledging that the GSM MSC 4200 successfully received the requested information.

The JLSR 1000 then sends 422 the GSM MSC 4200 a location_update message confirming the user's registration at the GSM MSC 4200 and indication a successful completion to the registration process.

Figure 5A:
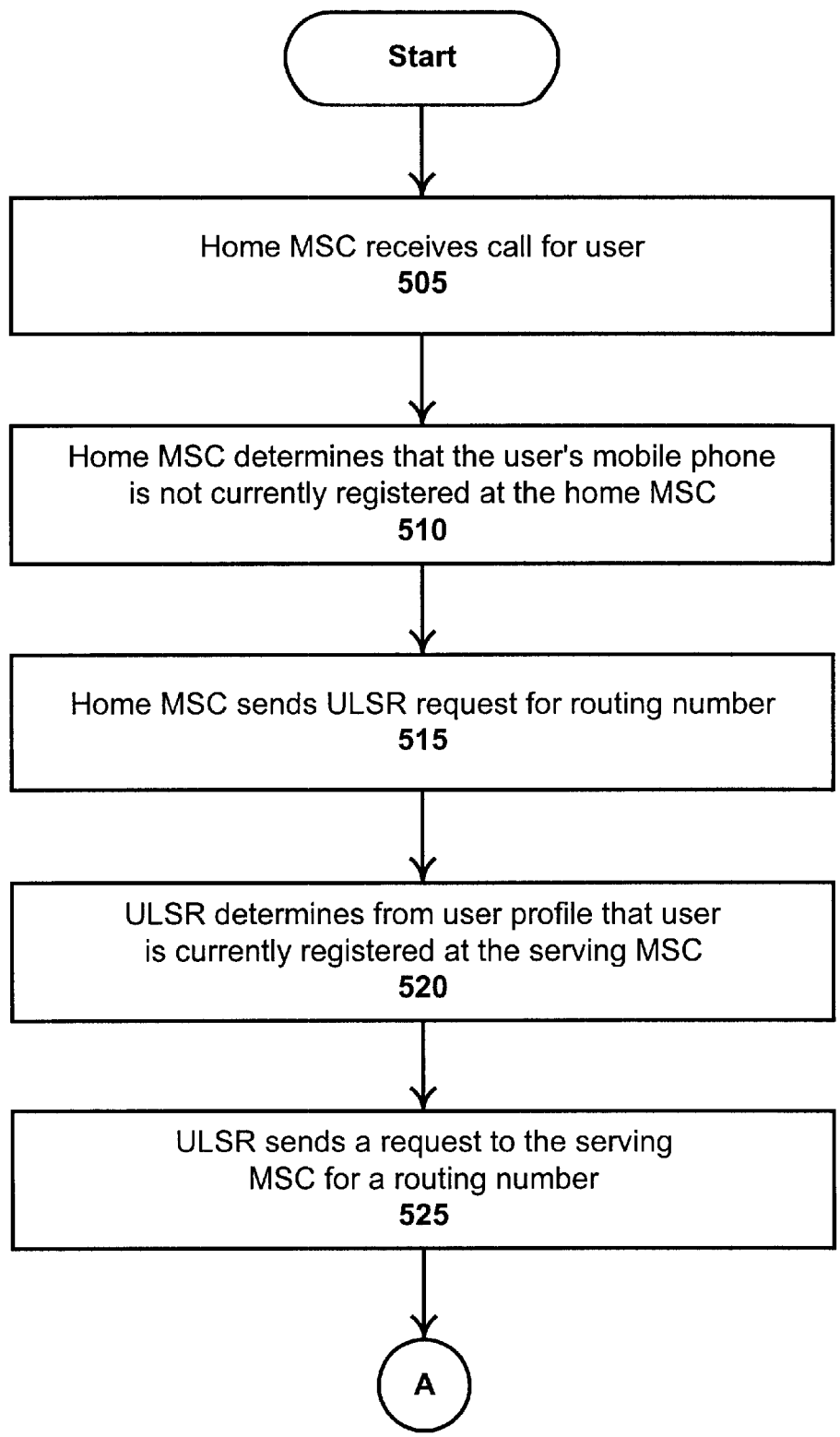
FIGS. 5a–5c illustrate a method according to one embodiment of the present invention for routing a call to a mobile phone user who has a home network but is currently registered in another network.
Figure 5B:
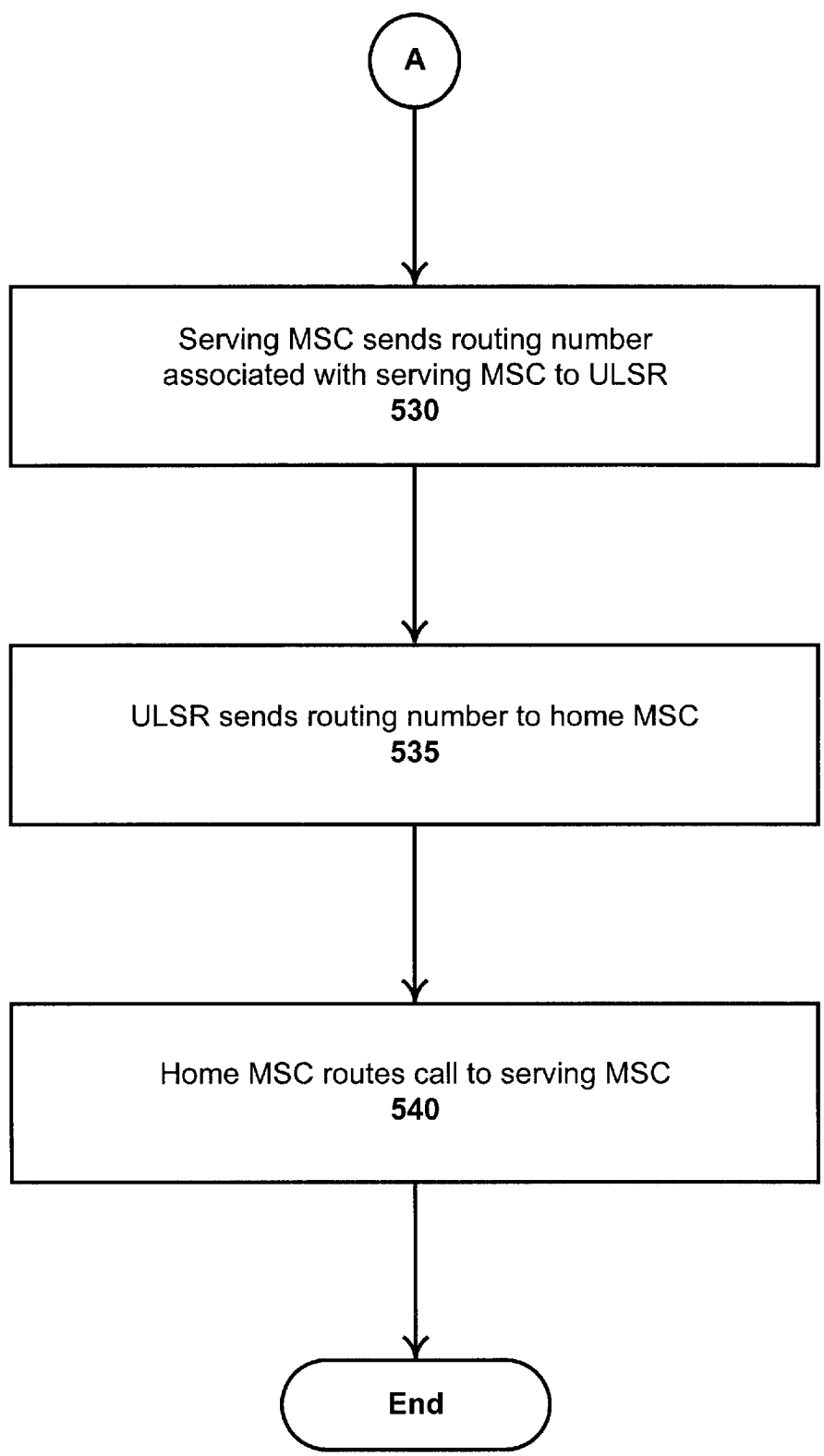
Figure 5C:
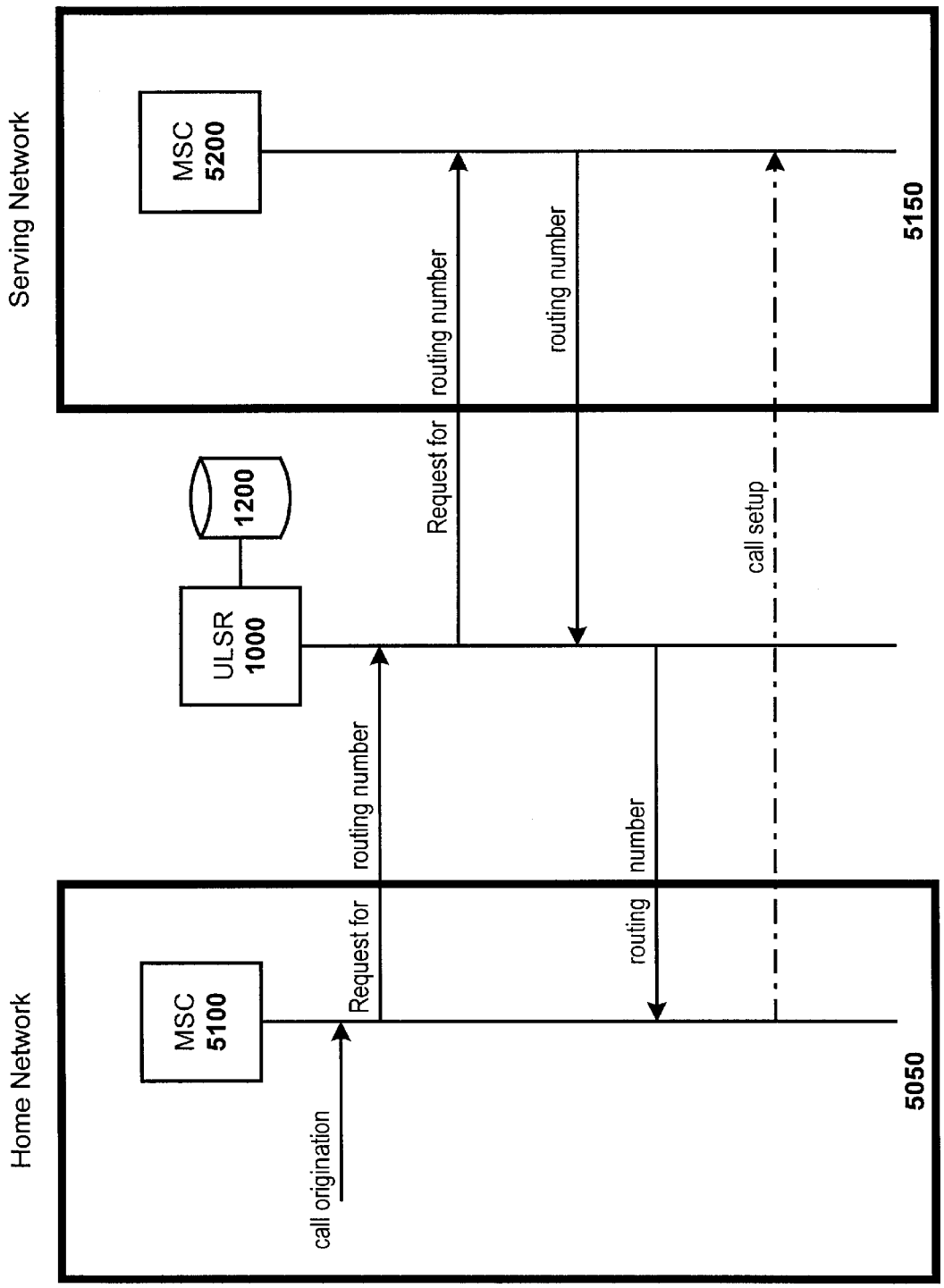

FIGS. 5a–5c illustrate a method according to one embodiment of the present invention for routing a call to a mobile phone user who has a home network 5050 but is currently registered in another network 5150 (the "serving network"). A call for the user is received 505 at the user's home MSC 5100 in the home network 5050 (the "home MSC"). The home MSC 5100 determines 510 that the user's mobile phone is currently not registered at the home MSC 5100, and sends 515 a request to the ULSR 1000 for a number to which to route the call, where the request includes the identity of the mobile phone. The ULSR 1000 retrieves the user profile associated with the mobile phone and determines 520 from the profile that the user's mobile phone is currently registered at an MSC 5200 in the serving network 5150 ("the serving MSC"). The ULSR 1000 then sends 525 a request to the serving MSC 5200 for a routing number, and the serving MSC 5200 sends 530 the ULSR 1000 a routing number associated with the serving MSC 5200. The ULSR 1000 then forwards 535 the routing number to the home MSC 5100, and the home MSC 5100 routes 540 the call to the serving MSC 5200. The ULSR 1000 uses the protocol of the home network 5050 to communicate with the home MSC 5100 and uses the protocol of the serving network 5150 to communicate with the serving MSC 5200.

Figure 6A:
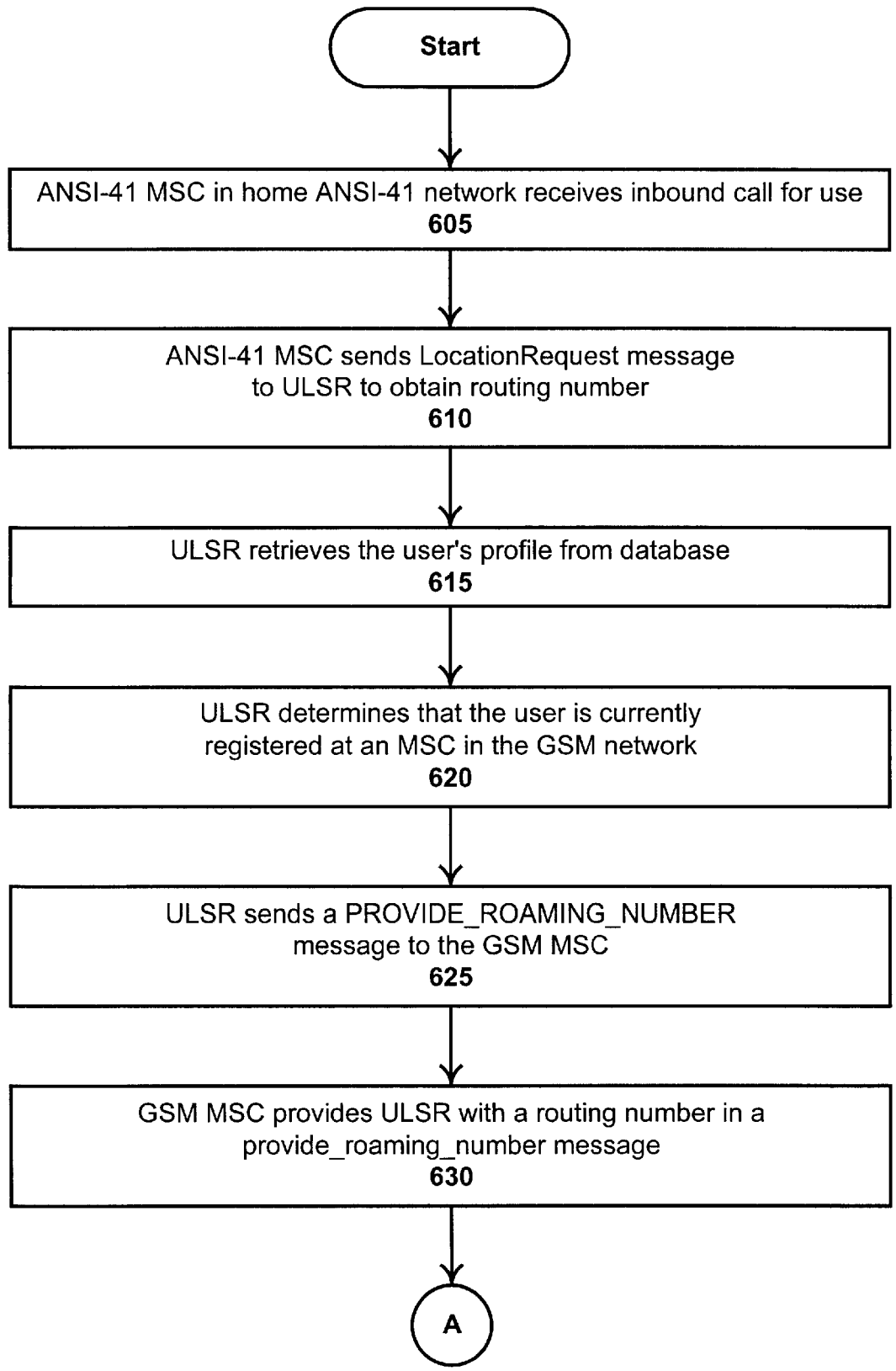
FIGS. 6a–6c illustrate a method according to one embodiment of the present invention for routing a call to a mobile phone user who has an ANSI-41 home network, but is currently registered in a GSM network.
Figure 6B:
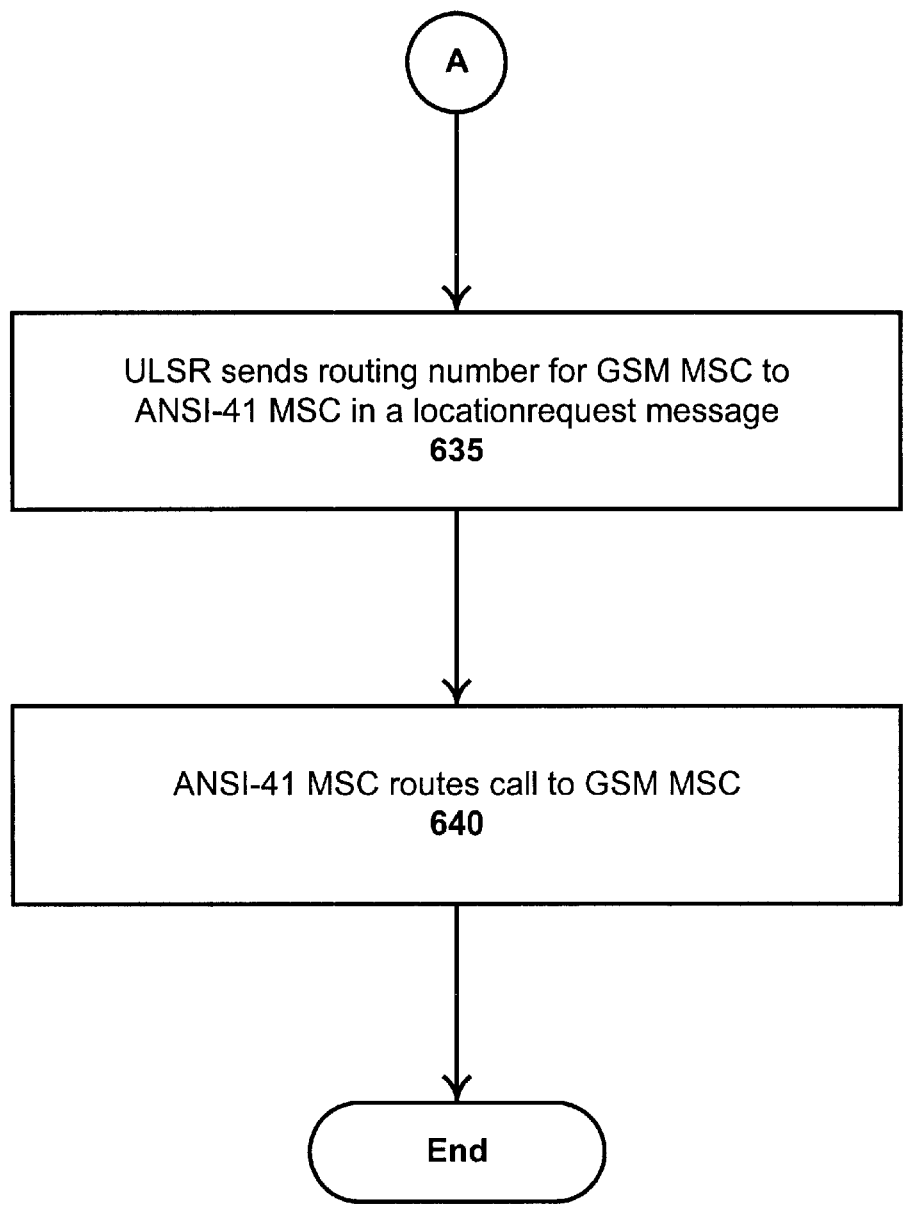
Figure 6C:
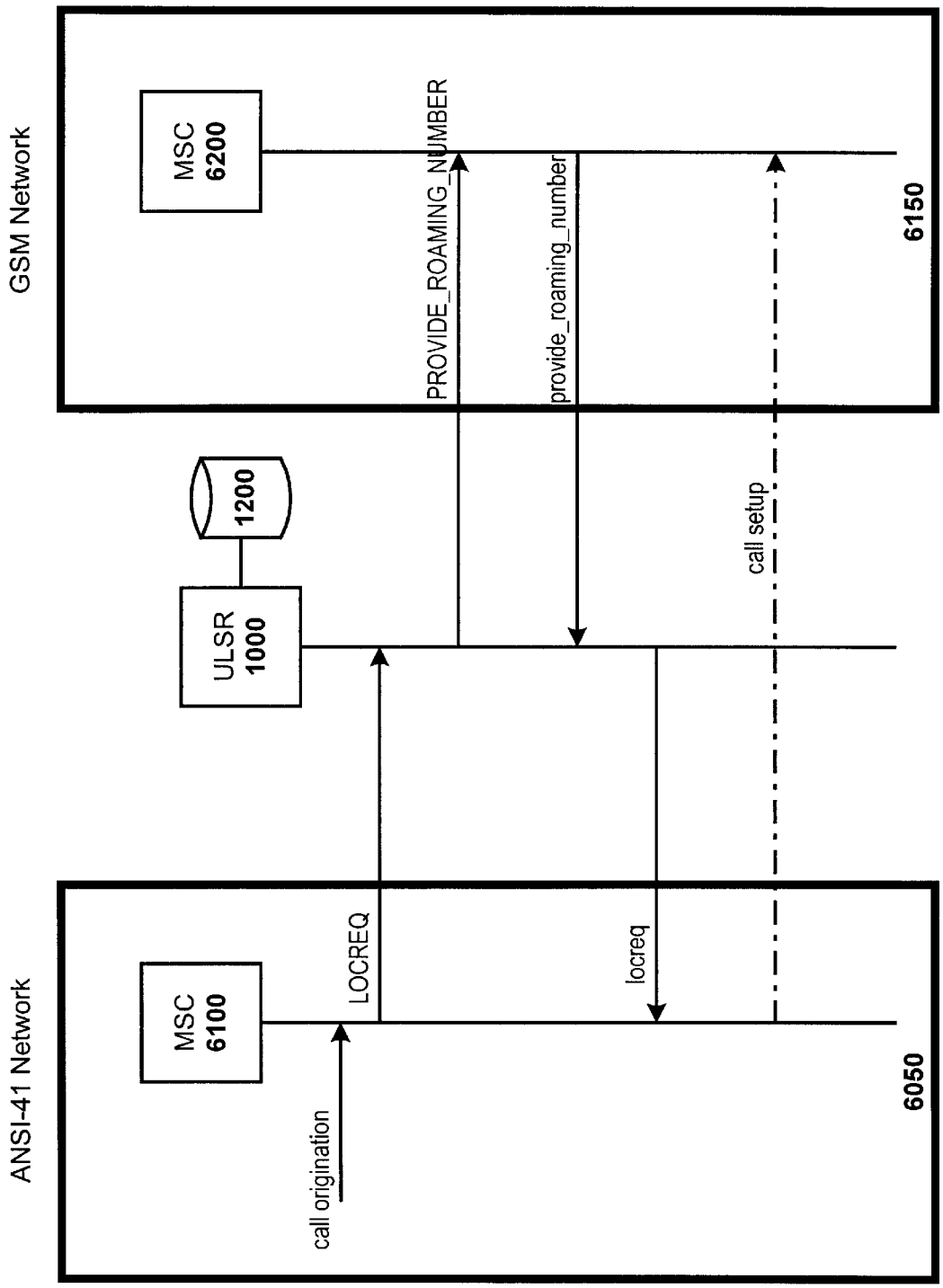

FIGS. 6a–6c illustrate an example of using the method described with respect to FIGS. 5a–5c for routing a call to a user who has an ANSI-41 home network 6050 but is currently registered in a GSM network 6150. The in-bound call for the user is received 605 at the user's home MSC 6100 in the ANSI-41 network 6050. The ANSI-41 MSC 6100 determines that the user's mobile phone is not currently registered at the ANSI-41 MSC 6100 and, therefore, sends 610 a LocationRequest message to the ULSR 1000 to obtain a routing number that can be used to route the incoming call to the mobile phone user. In response to receiving the LocationRequest message, the ULSR 1000 retrieves 615 the user's profile from its database 1200. The ULSR 1000 determines 620 from the user's profile that the mobile phone user is registered at an MSC 6200 in the GSM network 6150 and sends 625 a PROVIDE_ROAMING_ NUMBER message (which is a standard GSM message to request a number to which to route a call) to the MSC 6200 in the GSM network 6150 at which the mobile phone user is registered. The GSM MSC 6200 provides 630 the ULSR 1000 with one of its routing numbers in a provide_ roaming_number message. The ULSR 1000 then responds 635 to the ANSI-41 MSC 6100 with a locationrequest message that contains the routing number, and the ANSI-41 MSC 6100 routes 640 the call to the GSM MSC 6200 for the user.

In one embodiment, the ULSR 1000 can also manage services provided to customers in multiple communication networks. Examples of such services are call screening and number translation. In an alternate embodiment, such services are provided by another system (and not the ULSR 1000) accessible to multiple networks, where such services are provided using methods similar to those described herein.

Figure 7A:
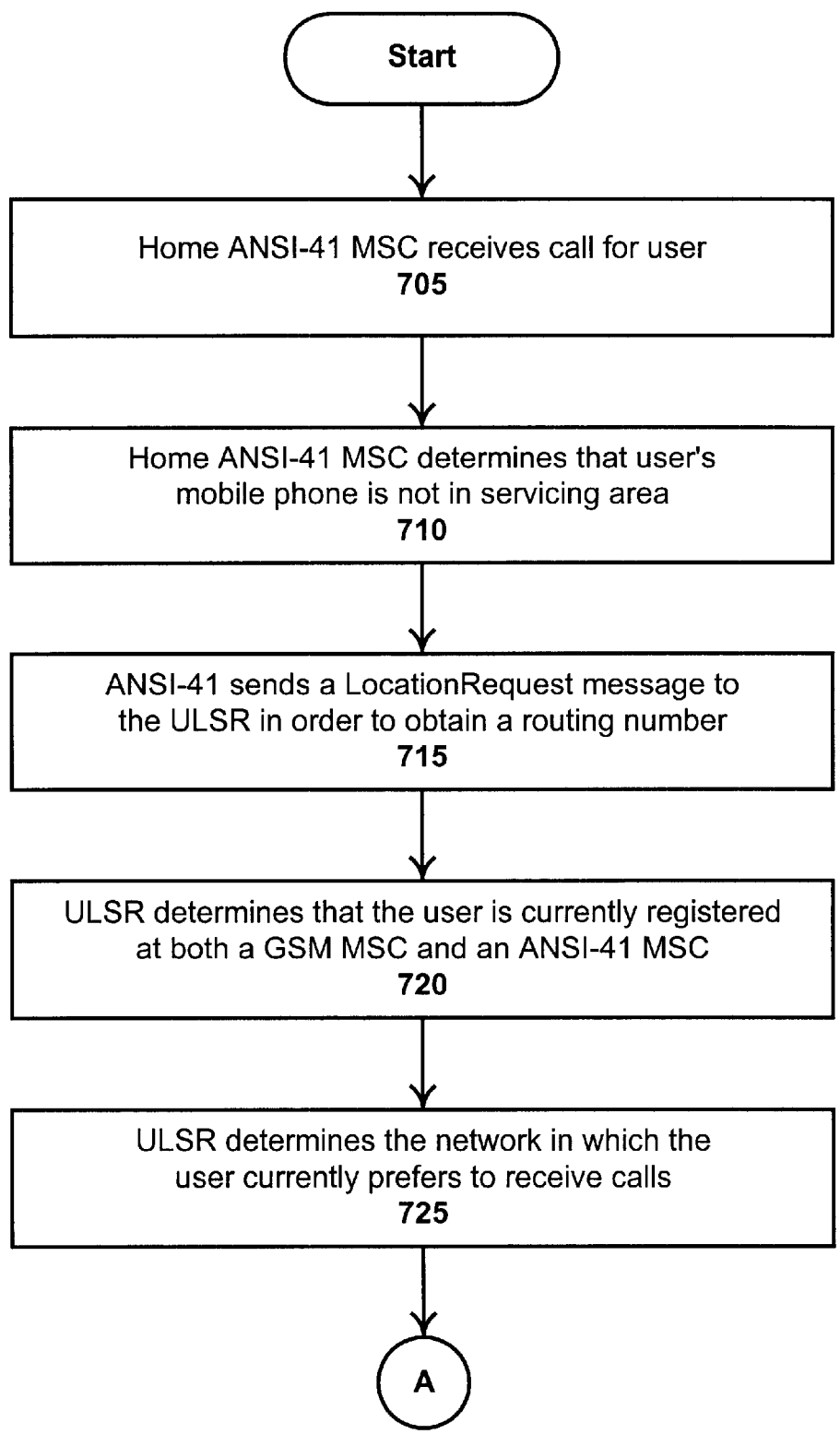
FIGS. 7a–7c illustrate a method according to one embodiment of the present invention for routing a call to a mobile phone user simultaneously registered in both a serving ANSI-41 network and a serving GSM network.
Figure 7B:
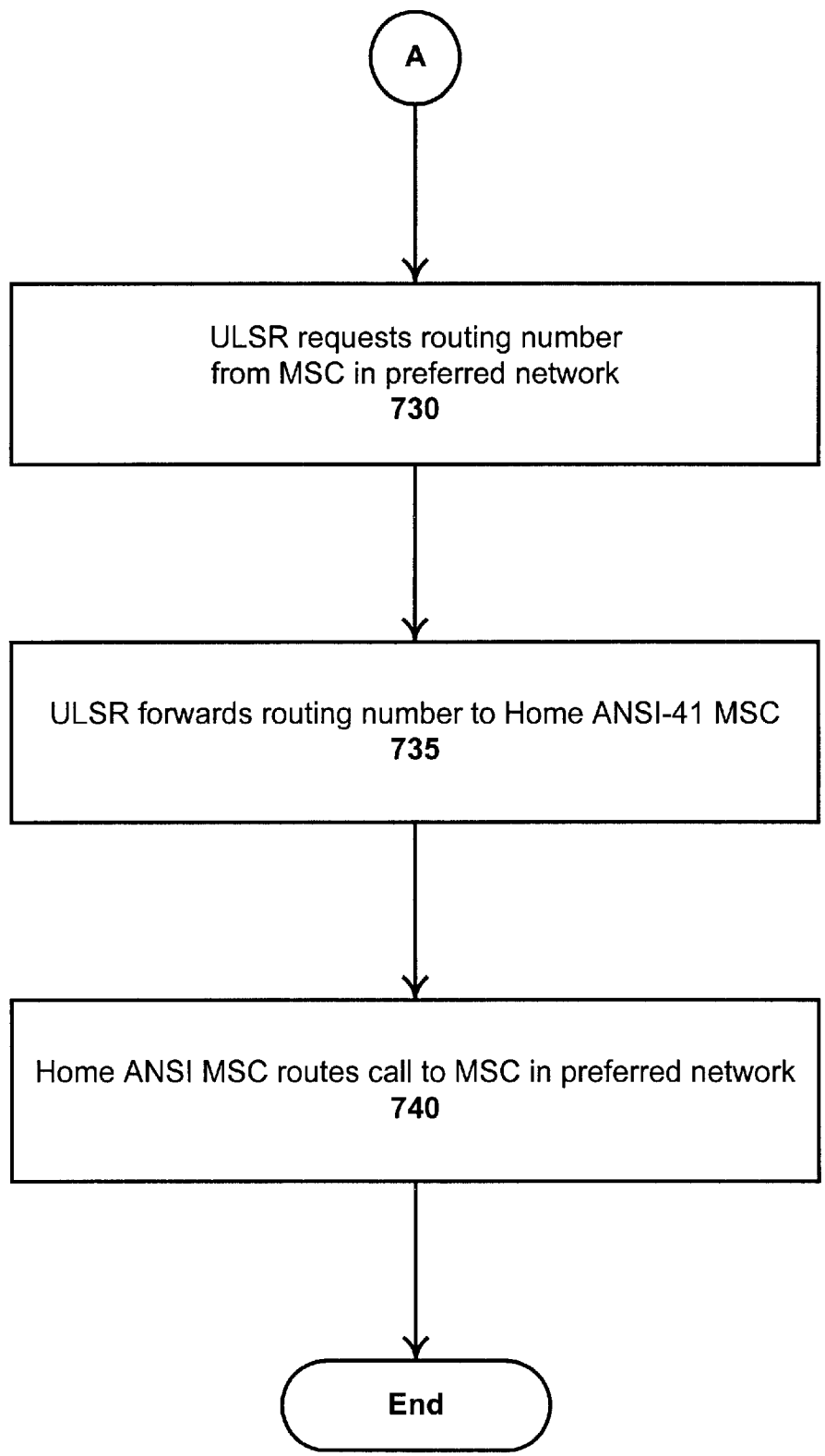
Figure 7C:
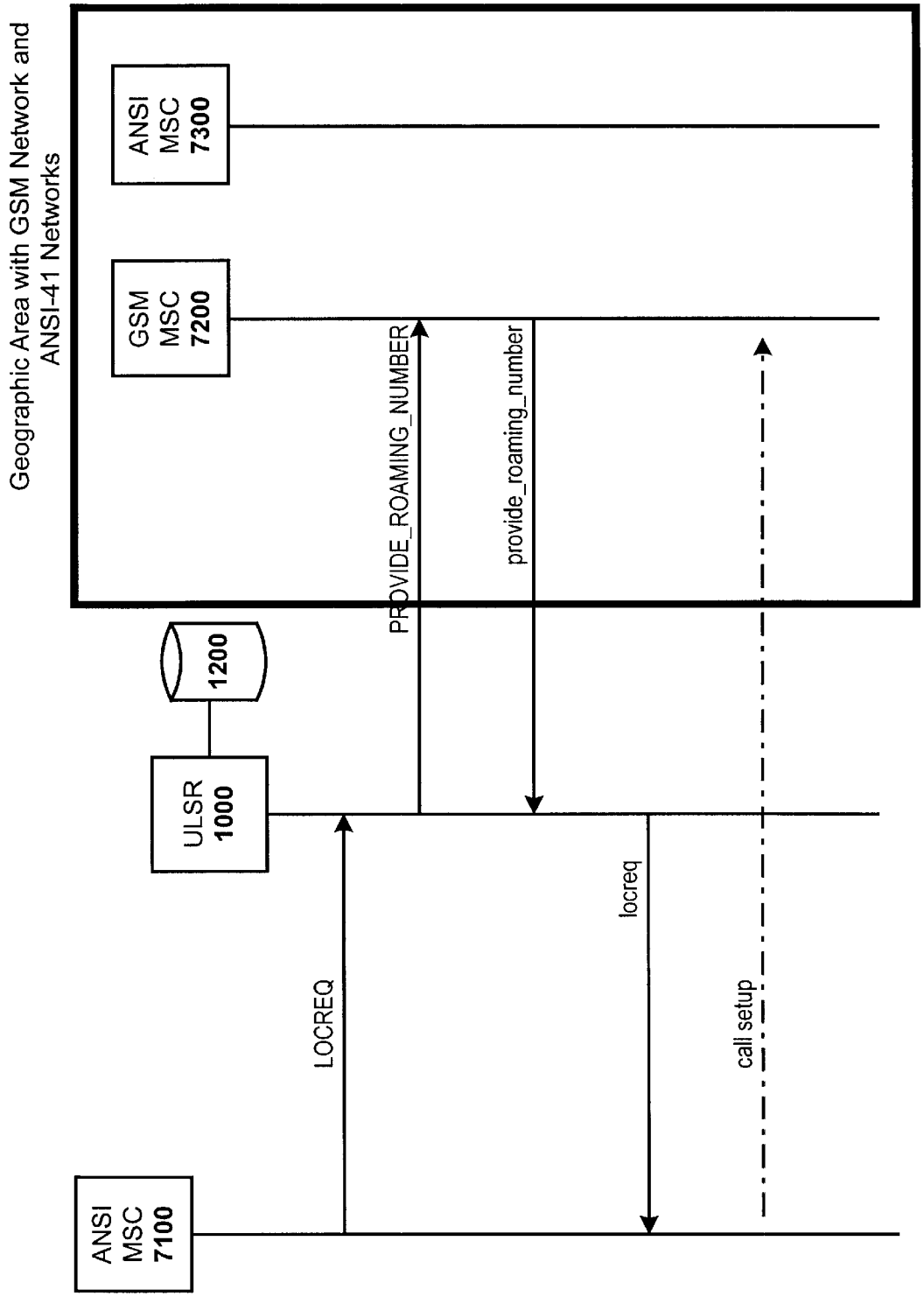

In one embodiment, the ULSR 1000 enables customers to be registered simultaneously in multiple networks. In this embodiment, the ULSR 1000 manages the interaction of services between networks for each subscriber. FIGS. 7a–7c illustrate an example a method according to one embodiment of the present invention for routing a call to a mobile phone user simultaneously registered in both a serving ANSI-41 network 7200 and a serving GSM network 7300. In this example, a call is received for the mobile phone user at the user's home ANSI-41 MSC 7100 and routed to a serving GSM MSC 7200, but this method also applies if a call is received at a user's home GSM MSC and routed to either a servicing ANSI-41 MSC or a servicing GSM MSC.

The home ANSI-41 MSC 7100 receives 705 a call for the mobile phone user and determines whether the user's mobile phone is within its servicing area (i.e., the home ANSI-41 MSC 7100 determines whether the mobile phone is currently registered at the home ANSI-41 MSC 7100). In response to determining 710 that the user's mobile phone is not in its servicing area, the home ANSI-41 MSC 7100 sends 715 a LocationRequest message to the ULSR 1000 in order to obtain a number to which to route the call (note that if a home GSM MSC had received the call, a LOCATION_ UPDATE message would be sent). The ULSR 1000 checks its database and determines 720 that the user is currently registered at both a GSM MSC 7200 and an ANSI-41 MSC 7300. Using information in the user's profile (which is stored in the ULSR's 1000 database 1200), the ULSR 1000 then determines 725 in which network in the coverage area in which the user is currently registered the user prefers to receive calls. In this example, the ULSR 1000 determines that the preferred network is the GSM network 7150 and, consequently, requests 730 a routing number from the GSM MSC 7200 in a PROVIDE_ROAMING_NUMBER message. The GSM MSC 7200 sends the ULSR 1000 a routing number in a provide_roaming_number message, and the ULSR 1000 forwards 735 the routing number to the home ANS1-41 MSC 7100 in a locationrequest message. The home ANSI-41 MSC 7100 then routes 740 the call to the GSM MSC 7200.

Figure 8:
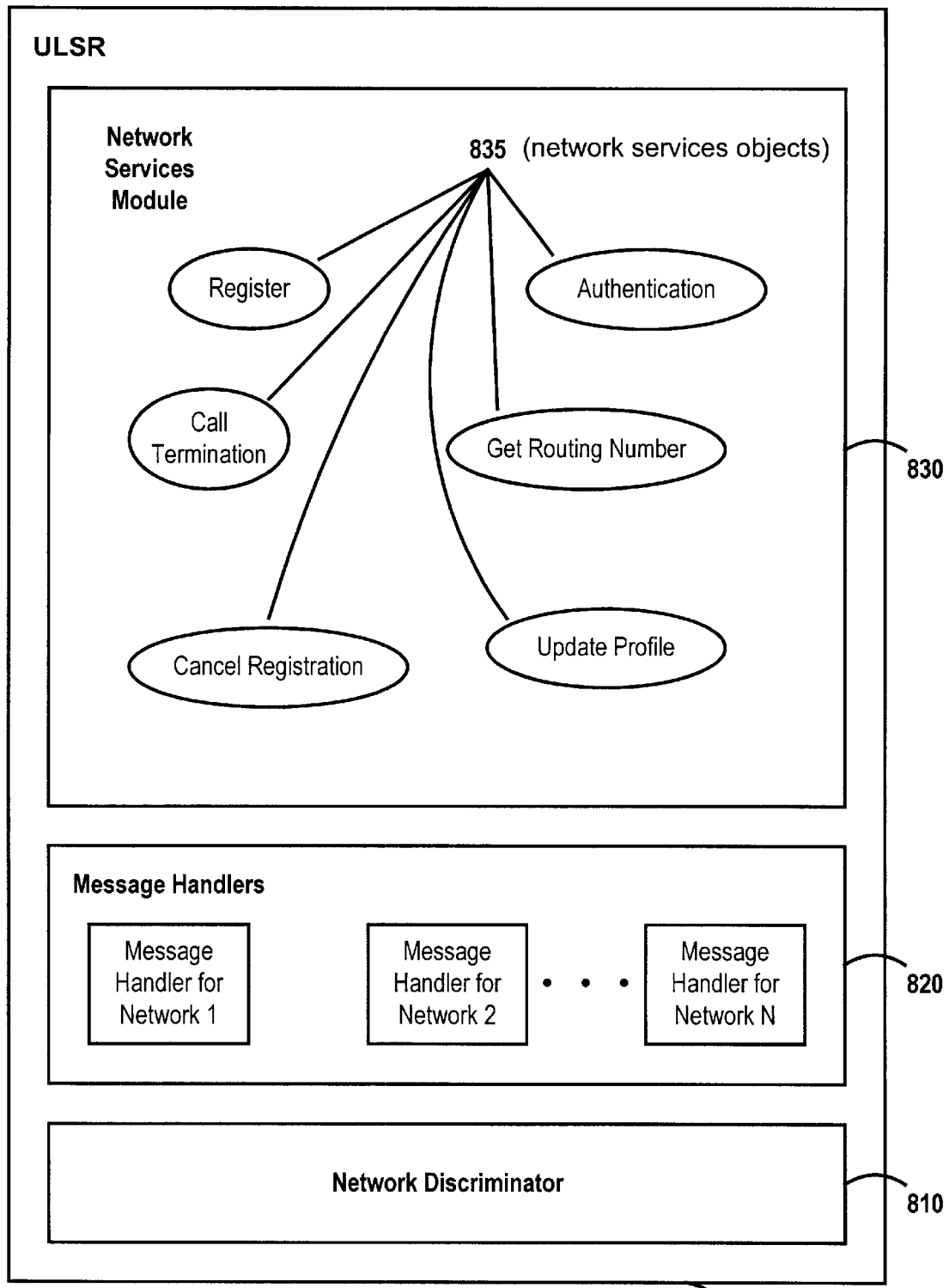
FIG. 8 illustrates an internal architecture for the ULSR according to one embodiment of the present invention.

FIG. 8 illustrates the internal architecture of the ULSR 1000 according to one embodiment of the present invention. The ULSR 1000 includes a network services software module 830, a message handler software module 820, and a network discriminator software module 810. In one embodiment, these modules 810, 820, and 830 are programmed in the 'C' programming language and run on Compaq Computer Corporation's Himilaya hardware with the NSK operating system and Compaq's Intelligent Network Server middleware software, but those skilled in the art will appreciate that the ULSR can be implemented using other software and hardware. The ULSR 1000 also includes appropriate interfaces (not shown) between the modules 810, 820, and 830, as well as an interface (not shown) to database 1200. The ULSR 1000 may also include interfaces for provisioning operations and maintenance of the platform.

The network discriminator 810 serves as an interface to any network elements that communicate with the ULSR 1000. For each message received at the ULSR 1000, the network discriminator 810 determines the type of network (e.g., ANSI-41, GSM, etc.) from which the message was sent based on the message format.

Once the network type is identified, the network discriminator module 810 sends the message to a message handler 820. There is at least one message handler 820 for each type of network that the ULSR 1000 supports (where message handlers 820 can be added as the ULSR 1000 is required to support new network types), and the network discriminator module 810 sends the message to the message handler 820 for the type of network from which the message was sent. Such message handler 820 identifies the type of message received from the operation code within the message or other applicable part of the message. For instance, an ANSI-41 message handler 820 identifies an ANSI-41 RegistrationNotification message by the operation code 0×0, which is the operation code assigned to the RegistrationNotification message per the-ANSI-41 Standard. Likewise, a GSM message handler 820 identifies a GSM UPDATE_LOCATION message from its operation code of 0×11 (per the GSM Standard). In one embodiment, the format of the operation code is the format defined in the Transaction Capability Application Part (TCAP) protocol.

After a message handler 820 identifies the type of message, it decodes the message and stores the substantive content of it in a conventional memory (not shown) in the ULSR 1000. The message handler 820 then initiates a network service object 835, which is a subcomponent of the network services module 830. The message handlers 820 normalize all information that they pass to network services objects 835 so that such information does not include any formatting specific to a particular network.

The network services module 830 includes multiple network service objects 835, where each object 835 performs one or more tasks required to process messages received from the message handlers. For every possible message that a message handler 820 can receive from a specific type of network, there is a network service object 835 that will be initiated by the message handler 820 to perform the function (s) required by the message. Because the network service objects 835 receive normalized. messages from the message handlers 820, they can each perform one or more functions for more than one type of network. In one embodiment, each network service object 835 performs a function for more than one network, whereas in an alternate embodiment, one or more network service objects 835 perform a function associated with a specific network.

Network service objects 835 can access and update the ULSR database 1200 as well as invoke other network service objects 835 as part of their normal execution. Additionally, network service objects 835 may initiate the transmission of a message to network elements in response to receiving a message from a network or for other reasons, such as changes to customer information stored in the ULSR database 1200 that require a message to be sent to one or more networks (e.g., a QualificationDirective message in an ANSI-41 network). Messages initiated by network service objects 835 are not formatted for a particular type of network, and, therefore, the message handlers 820 are responsible for properly formatting messages initiated by network service objects 835. The network discriminator 810 is responsible for sending the formatted messages to the appropriate networks.

FIG. 8 illustrates some examples of various types of network service objects 835, but in no way does FIG. 8 illustrate a complete set of the types of network services objects. In one embodiment, the Register Network object executes the logic required to process messages received by the ULSR for devices attempting to register in a network (e.g., a RegistrationNotification message received from an ANSI-41 network). The CallTermination object processes messages received when calls are made to users subscribing to one of the networks supported by the ULSR. For instance, if the MSC receiving the incoming call is in an ANSI-41 network, then a Location Request message is received by the ULSR and executed by the Call Termination Network. The Authentication object determines whether a user is authorized to register at a particular network. The Get Routing Number object obtains a routing number for an MSC. For instance, during the processing of a call for a user, the Call Termination object may request a routing number from the Get Routing Number object, in which case the Get Routing Number object would manage the generation of messaging to request a routing number from the MSC at which the user is registered. The Cancel Registration object performs the necessary updates to the ULSR database 1200 and manages the messaging to cancel the registration of a user at a particular MSC. The Update Profile object manages the generation of messaging indicating that a registered user's profile has been updated. The network service object 835 described herein are examples of one embodiment, and those skilled in the art will appreciate that the types of network service objects 835 in the ULSR 1000 and their functions may vary.

Figure 9:
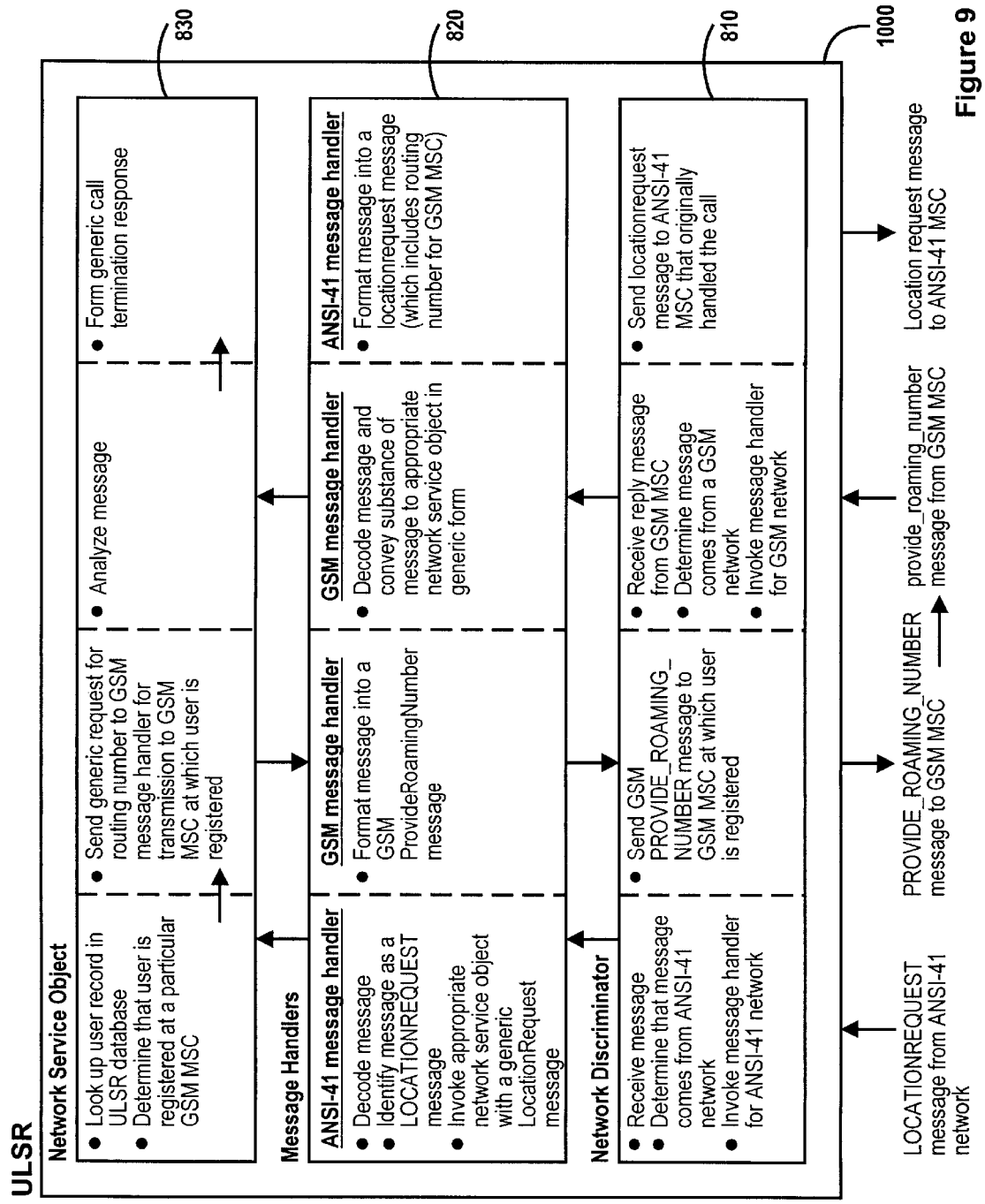
FIG. 9 illustrates an example, according to one embodiment of the present invention, of how the internal architecture works to process a LocationRequest message from an ANSI-41 MSC.

FIG. 9 illustrates an example of how the network discriminator 810, message handlers 820, and network services objects 835 work to process a call received at an ANSI-41 MSC for a user who is currently registered and able to receive a call in a GSM network. When the home ANSI-41 MSC receives the call and realizes that the user is registered elsewhere, it sends a LocationRequest messaged to the ULSR 1000 in order to get a routing number for the MSC at which the user is currently registered. The LocationRequest message is received by the network discriminator 810, which identifies the message as an ANSI-41 message. The message discriminator 810 then invokes the ANSI-41 message handler 820, which identifies the message as a LocationRequest message, normalizes the LocationRequest message and user information to remove network-specific dependencies, and invokes the appropriate network services object 835 with the normalized information.

The network services object 835 then processes the request. As part of its logic, it will look up the current state of the user in the ULSR database 1200 to determine whether a user is registered at any MSC. If the user is registered at an MSC, the network services object 835 sends a generic (i.e., not formatted for a particular network serviced by the ULSR 1000) request for a routing number to the message handler 820 associated with the network in which the user is registered. In this example, the user's record indicates that the user is currently registered at a particular GSM MSC. Consequently, the network services object 835 sends a generic message requesting a routing number for such GSM MSC to the GSM message handler 820.

The GSM message handler 820 then formats the message into a GSM PROVIDE_ROAMING_NUMBER message, and the network discriminator 810 sends the PROVIDE_ROAMING_NUMBER message to the GSM MSC at which the user is registered. The GSM MSC replies to the ULSR 1000 with a routing number in the form of a provide_roaming_number message. The reply is received at the network discriminator 810, which determines that the reply comes from a GSM network, and, therefore, the reply is sent to a GSM message handler 820, which decodes the reply and sends the substantive content of the reply (e.g., the roaming number) in a generic, non-network dependent form to the appropriate network services object 835. The network service object 835 analyzes the reply for a routing number for the GSM MSC and sends to the ANSI-41 message handler 820 a response that includes the routing number. The ANSI-41 message handler 820 formats a locationrequest message (which includes the routing number), and the network discriminator 810 sends it to the gateway ANSI-41 MSC that originally handled the call.

The present invention has been described in the context of a mobile phone network, but it could also be used to provide services for other wireless devices, such as pagers or portable computers for example. Moreover, although the present invention has been described above in terms of specific embodiments, it is anticipated that alterations and modifications thereof will no doubt become apparent to those skilled in the art. It is therefore intended that the following claims be interpreted as covering all such alternatives and modifications as falling within the true spirit and scope of the invention.

What is claimed is:

1. A computer system for use in a wireless communications network, comprising:

a network discriminator module for determining a type of network from which received messages originate;

a first message handler module for decoding messages, formatted in accordance with a first protocol, received from a first wireless network and for encoding messages in accordance with the first protocol for transmission to the first wireless network;

a second message handler module for decoding messages, formatted in accordance with a second protocol, received from a second wireless network and for encoding messages in accordance with the second protocol for transmission to the second wireless network;

a third message handler module for decoding messages, formatted in accordance with a third protocol, received from a third wireless network and for encoding messages in accordance with the third protocol for transmission to the third wireless network; and a network services module for writing registration information associated with mobile communication devices in the first, second and third wireless networks to a database; for reading the registration information from the database; and for generating generic messages for communication with the first, second and third wireless networks.

2. The computer system of claim 1, wherein each module is implemented as a set of computer readable instructions capable of being executed by a microprocessor.

3. A computer system for use in a wireless communications network, comprising:

means for determining a type of network from which received messages originate;

means for decoding messages, formatted in accordance with a first protocol, received from a first wireless network and for encoding messages in accordance with the first protocol for transmission to the first wireless network;

means for decoding messages, formatted in accordance with a second protocol, received from a second wireless network and for encoding messages n accordance with the second protocol for transmission to the second wireless network;

means for decoding messages, formatted in accordance with a third protocol, received from a third wireless network and for encoding messages in accordance with the third protocol for transmission to the third wireless network; and means for writing registration information associated with mobile communication devices in the first, second and third wireless networks to a database; for reading the registration information from the database; and for generating generic messages for communication with the first, second and third wireless networks.

4. A method for providing routing information between wireless communications systems, each wireless communications system having an associated protocol, the method comprising:

receiving a first routing number request message for a first mobile communications device user from a first wireless communications network;

retrieving from a database an indication that the first mobile communication device user is registered in a second wireless communications system;

sending a request for a first routing number to the second wireless communication system in accordance with the second protocol;

receiving from the second wireless, communication system the first routing number in accordance with the second protocol;

sending the first routing number to the first wireless communication system in accordance with the first protocol;

receiving a second routing number request message for a second mobile communications device user from the first wireless communications network;

retrieving from the database an indication that the second mobile communication device user is registered in a third wireless communications system;

sending a request for a second routing number to the third wireless communication system in accordance with the third protocol;

receiving from the third wireless communication system the second routing number in accordance with the third protocol; and sending the second routing number to the first wireless communication system in accordance with the first protocol.

5. A method for providing routing information between wireless communications networks for a mobile device registered in a first wireless communication network, the method comprising:

receiving a message from a second wireless communication network indicating that the mobile communication device user has requested registration at the second wireless communication network;

storing in a database an indication that the mobile communication device user is registered in the second wireless communication network;

determining whether the mobile communication device user should be registered in only one wireless communications network; and in response to determining that the mobile communication device user should be registered in only one wireless communications network, sending a message to the first wireless communication network that the mobile communication device user is no longer registered at the first wireless communication network.

* * * * *